(12) United States Patent
Nomoto et al.

(10) Patent No.: US 10,033,892 B2
(45) Date of Patent: Jul. 24, 2018

(54) IMAGE READING APPARATUS

(71) Applicant: SEIKO EPSON CORPORATION, Tokyo (JP)

(72) Inventors: Kosuke Nomoto, Fukuoka (JP); Shinsuke Kogi, Fukuoka (JP); Kazuya Yoshikaie, Fukuoka (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/253,006

(22) Filed: Aug. 31, 2016

(65) Prior Publication Data
US 2017/0094086 A1 Mar. 30, 2017

(30) Foreign Application Priority Data

Sep. 28, 2015 (JP) ................................. 2015-190178

(51) Int. Cl.
H04N 1/04 (2006.01)
H04N 1/00 (2006.01)
(Continued)

(52) U.S. Cl.
CPC ..... *H04N 1/00657* (2013.01); *H04N 1/00588* (2013.01); *H04N 1/00599* (2013.01); *H04N 1/00663* (2013.01); *H04N 1/00827* (2013.01); *H04N 1/00832* (2013.01); *H04N 1/4076* (2013.01); *H04N 1/58* (2013.01); *G03G 15/5062* (2013.01); *G03G 21/00* (2013.01); *H04N 2201/0081* (2013.01); *H04N 2201/3232* (2013.01); *H04N 2201/3242* (2013.01); *H04N 2201/3269* (2013.01)

(58) Field of Classification Search
CPC .......... H04N 1/00657; H04N 1/00588; H04N 1/00599; H04N 1/00663; H04N 1/00827; H04N 1/00832
USPC ......................................... 358/486, 498, 474
See application file for complete search history.

(56) References Cited

U.S. PATENT DOCUMENTS 6,304,314 B1 * 10/2001 Rider ........................ G01P 3/36
355/27
2007/0127087 A1 6/2007 Nabemoto et al.
(Continued)

FOREIGN PATENT DOCUMENTS

EP 0877523 A2 11/1998
JP 63-299671 A 12/1988
(Continued)

OTHER PUBLICATIONS

The Extended European Search Report for the corresponding European Application No. 16190293.7 dated Feb. 1, 2017.

Primary Examiner — Houshang Safaipour

(57) ABSTRACT

An image reading apparatus is provided with an identification information reading unit (reading unit, NFC reader, and identification information acquisition unit) which acquires identification information by reading the identification information from a section to be read at which identifiable identification information is recorded for each individual carrier sheet and which is provided at a joining section of the carrier sheet in which two transparent sheets for pinching an original document are joined at a portion of a peripheral edge portion; and a processor which performs a process which is associated with the identification information read by the identification information reading unit.

6 Claims, 12 Drawing Sheets

(51) Int. Cl.
    *H04N 1/407*     (2006.01)
    *H04N 1/58*     (2006.01)
    *G03G 15/00*     (2006.01)
    *G03G 21/00*     (2006.01)

(56) References Cited

U.S. PATENT DOCUMENTS

| | | | |
|---|---|---|---|
| 2008/0204827 A1* | 8/2008 | Yoshio | H04N 1/00212 358/498 |
| 2010/0166440 A1* | 7/2010 | Nishimura | G03G 15/065 399/29 |
| 2011/0194127 A1 | 8/2011 | Nagakoshi et al. | |

FOREIGN PATENT DOCUMENTS

| | | |
|---|---|---|
| JP | 2005-260387 A | 9/2005 |
| JP | 2008-236702 A | 10/2008 |
| JP | 2011-166537 A | 8/2011 |

* cited by examiner

TO FIG. 8B

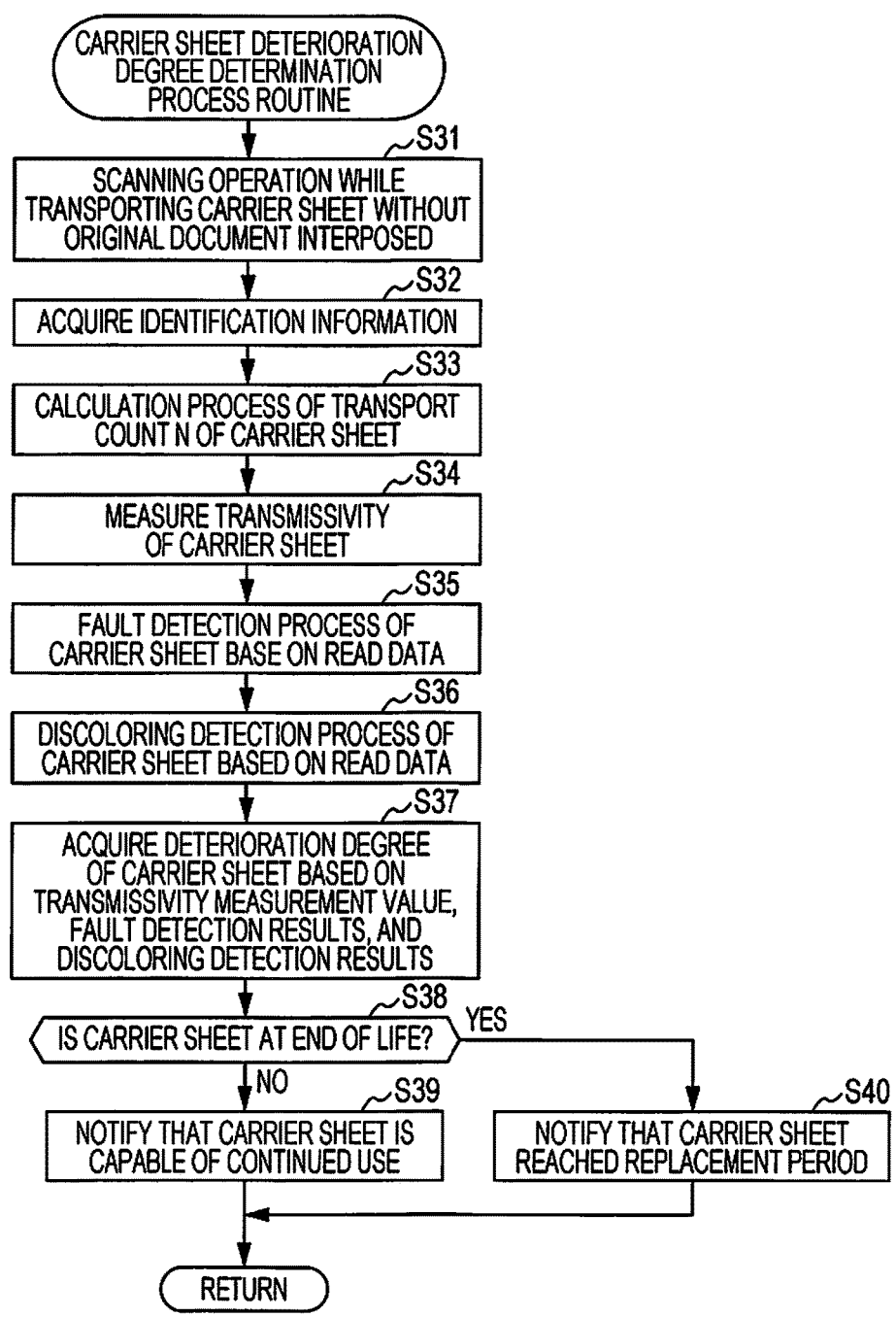

IMAGE READING APPARATUS

BACKGROUND

1. Technical Field

The present invention relates to an image reading apparatus such as a scanner and an image reading system which read an image of an original document.

2. Related Art

In the related art, a sheet feed method in which a transport unit which is able to transport original documents one at a time along a transport path is provided in an image reading apparatus, and a reading unit disposed at a predetermined position partway along the transport path reads an original document during transport, and a flat bed method in which a reading unit provided on a carriage reads an original document while the carriage moves relative to the original document mounted on an original document stand are known.

There is also need for reading of booklet original documents formed of a plurality of sheets, such as passports or bankbooks or images of bifold original documents which are folded in two, such as a resume, in the sheet feed-type image reading apparatus. Although there are also cases where reading is possible if the bifold original document is spread out and set, there is a need for an original document to be read as folded by an image reading apparatus which only corresponds to the bifold size.

A separating mechanism which separates a plurality of original documents stacked on a document tray one by one is provided in the transport unit. Therefore, there are cases where, for a booklet original document such as a passport, or a bifold original document such as a resume, it is difficult for a suitable image to be read while shifted in an incline or the like according to the force applied from the separating mechanism when the bifold original documents are separated one at a time during transport. Therefore, there are cases where a carrier sheet in which one end portion of two non-colored transparent sheets are joined is used when performing the reading of a booklet document such as a passport or bankbook, or bifold original document such as a resume. In this case, it is possible to transport the carrier sheet without interference by the separating mechanism and possible to read an image of the original document pinched by the carrier sheet by setting the carrier sheet with the original document pinched therein on a document tray.

For example, JP-A-2008-236702 discloses a carrier sheet on which a transport protocol or user identification information is described. When the original document is read pinched in the carrier sheet, the image reading apparatus reads the user identification information and performs reading of the original document in response to the settings for each user based on the user identification information.

JP-A-63-299671 discloses an image reading apparatus which controls the transport unit in response to the displacement amount of a guide mark which is read.

Furthermore, JP-A-2011-166537 discloses an image reading apparatus in which a carrier sheet mark is described on the carrier sheet, and which determines the reading position of the original document pinched by the carrier sheet from the carrier sheet mark. In this case, it is possible to read the original document pinched by the carrier sheet at a suitable reading position.

JP-A-2005-260387 discloses an image reading apparatus which uses a mark at the edge portion of the carrier sheet, specifies the stitching direction which is the direction of the fold of the folded document, and joins two images in the specified stitching direction in a case where processing in which both sides of a folded document pinched by the carrier sheet are read, and the image of the front surface and the image of the rear surface are joined in one image is undertaken.

When the surface of the carrier sheet is scratched or the carrier sheet is discolored, such as yellowing, it becomes difficult to suitably read an image of the original document. However, the user is only able to determine the level of influence scratching or the yellowing of the carrier sheet used exerts on the image from defects such as stripes appearing in the image. Although also depending on the model of the image reading apparatus, the number of transports (lifetime) of the carrier sheet for which the reading image quality is guaranteed is approximately 500 to 3000 times, as an example. However, even in a specification capable of 3000 transports, since it is difficult to record what the count of the carrier sheet used is, the user does not ascertain whether or not the carrier sheet reaches the lifetime of the specification. As a result, there are cases where a carrier sheet continues to be used even if the guaranteed number of uses is exceeded. However, when a carrier sheet continues to be used exceeding the guaranteed number of uses, a problem such as the influence due to deterioration such as scratches or discoloring of the carrier sheet appearing in the image of an original document read by the image reading apparatus and the image quality of the original document lowering arises. The type of scratching, discoloring or the like differs for each individual carrier sheet. There are also cases where the task conditions which include the reading conditions, the save format of the read data, or the like when the original document is read using the carrier sheet are determined for each individual carrier sheet. However, although the carrier sheets disclosed in JP-A-2008-236702, JP-A-63-299671, JP-A-2011-166537, and JP-A-2005-260387 are associated with the information necessary when the carrier sheet is used, the information is not associated for each individual carrier sheet.

SUMMARY

An advantage of some aspects of the invention is to provide an image reading apparatus and an image reading system which is able to perform suitable processing matching an individual carrier sheet.

Hereinafter, means of the invention and operation effects thereof will be described.

According to an aspect of the invention, there is provided an image reading apparatus including an identification information reading unit which acquires identification information by reading the identification information from a section to be read at which identifiable identification information is recorded for each individual carrier sheet and which is provided at a joining section of the carrier sheet in which two transparent sheets for pinching an original document are joined at a portion of a peripheral edge portion; and a processor which performs a process which is associated with the identification information read by the identification information reading unit.

According to the configuration, the identification information which is able to individually identify the carrier sheet from a section to be read provided at the joining section of the carrier sheet is acquired by the reading of the identification information reading unit. The processor performs processing associated with the identification information acquired by the identification information reading unit. Thus, it is possible to perform favorable processing matched to the individual carrier sheet.

It is preferable that the image reading apparatus further include a transport unit which transports the carrier sheet; and a reading unit which read an original document pinched by the carrier sheets on a transport path, and the processor counts the number of transports of the carrier sheets for each item of identification information as the process.

According to the configuration, the processor counts the number of transports of the carrier sheet per identification information. Thus, the number of transports of the carrier sheet can be individually managed.

It is preferable that the image reading apparatus further include a notification unit which performs notification that the carrier sheet is deteriorated when the number of transports of the carrier sheet is a threshold number or more.

According to the configuration, notification is performed by the notification unit that the carrier sheet is deteriorated when the number of transports of the carrier sheet is a threshold number or more. Thus, the user easily avoids unknowingly continuing to use the carrier sheet for a carrier sheet for which the number of transports reaches the threshold number.

It is preferable that the image reading apparatus further include a detector which detects a deterioration degree of the carrier sheet based on the number of transports of the carrier sheet, and the processor performs the process in response to the deterioration degree.

According to the configuration, the deterioration degree of the carrier sheet is detected by the detector based on the number of transports of the carrier sheet. The process is performed by the processor in response to the deterioration degree of the carrier sheet. Thus, by performing the process in response to the deterioration degree of the carrier sheet, only a similar process to when the deterioration degree is low is performed regardless of the deterioration degree of the carrier sheet being comparatively high and it becomes easy to avoid the influence of deterioration appearing in the read data when the deterioration degree increases.

It is preferable that the image reading apparatus further include a reading unit which reads an original document pinched by the carrier sheets, and the processor causes the original document pinched by the carrier sheets to be read by the reading unit in task conditions associated with the identification information as the process.

According to the configuration, the processor causes the reading unit to read the original document pinched by the carrier sheet in task conditions associated with the identification information with which the carrier sheet is individually identifiable. Thus, the user can cause the original document to be read in suitable task conditions matching the individual carrier sheet.

In the image reading apparatus, it is preferable that the task conditions include at least one condition from reading conditions, image processing conditions, and read data save conditions.

According to the configuration, when the user causes the image reading apparatus to read the original document pinched by the carrier sheet, read data of the original document with at least one from the reading conditions, the image processing conditions, and the read data save conditions associated with the identification information for the individual carrier sheet can be provided.

It is preferable that the image reading apparatus further include a light receiving unit which receives transmitted light in which light from a light source passes through a transparent portion of the carrier sheet, and the processor includes a detector which detects the deterioration degree of the carrier sheet based on the light reception data obtained by the light receiving unit receiving light.

According to the configuration, the deterioration degree of the carrier sheet is detected by the detector based on the light reception data obtained by transmitted light in which light from the light source passes through the transparent portion of the carrier sheet being received by the light receiving unit. Thus, the actual deterioration degree in response to the individual method of use for each carrier sheet can be better acquired than a case of detecting the deterioration degree based on the number of transports of the carrier sheet. For example, the user can easily avoid continuing to use a carrier sheet in which the lifetime is reached lowering the light transmissivity and can carry out and image correction process in response to the deterioration degree on the image of the original document.

It is preferable that the image reading apparatus further include a notification unit which performs notification that the carrier sheet is deteriorated when the deterioration degree detected by the detector reaches a threshold number or more.

According to the configuration, when the deterioration degree detected by the detector reaches the threshold or higher, notification is performed by the notification unit that the carrier sheet is deteriorated. Thus, the user easily avoids continuing to use the carrier sheet without knowing the carrier sheet is deteriorated.

In the image reading apparatus, it is preferable that the light receiving unit be a reading unit which reads the original document pinched by the carrier sheets, and the detector detect the deterioration degree of the carrier sheet based on a color difference between a first color value obtained by the reading unit reading a color of the transparent portion of the initial carrier sheet and a second color value obtained by the reading unit reading a color of the transparent portion of the current carrier sheet.

According to the configuration, the deterioration degree of the carrier sheet is detected based on the color difference between the first color value obtained by the reading unit reading the color of the transparent portion of the carrier sheet at the usage start initiation of the carrier sheet and the second color value obtained by the reading unit reading the color of the current carrier sheet. Thus, the deterioration degree of the carrier sheet can be acquired. For example, the user can easily avoid continuing to use a carrier sheet without knowing that the carrier sheet is discolored and can carry out the image correction process on the image of the original document in response to the deterioration degree.

In the image reading apparatus, it is preferable that a color reference section that exhibits a reference color used in color correction of the read data read by the reading unit be provided at a position that is readable by the reading unit, and the detector detect the deterioration degree of the carrier sheet based on a color difference between the first color value based on the image at which the color reference section is read without the carrier sheet and an image at which the color reference section is read via the initial carrier sheet and the second color value based on an image at which the color reference section is read without the current carrier sheet and an image at which the color reference section is read via the current carrier sheet.

According to the configuration, the first color value is acquired based on the image at which the color reference section is read by the reading unit without the carrier sheet and the image at which the color reference section is read through the initial color sheet at the usage start initiation of the carrier sheet. The second color value is acquired based on the image at which color reference section is read by the current reading unit without the carrier sheet and the image at which the color reference section is read through the current color sheet. The deterioration degree of the current carrier sheet is detected by the detector based on the first color value and the second color value. Thus, the deterioration degree pertaining to the discoloring such as yellowing of the carrier sheet can be detected individually with a comparatively high precision in which the influence of the deterioration over time of the reading unit is canceled out.

In the image reading apparatus, it is preferable that the light receiving unit be a reading unit which is able to read the original document, and the detector detect the deterioration degree of the carrier sheet based on the light reception data obtained by receiving transmitted light passing through a reading object region with the reading object region of the carrier sheet not pinching the original document as the transparent portion.

According to the configuration, the deterioration degree of the carrier sheet is detected based on the light reception data obtained by transmitted light passes through the reading object region with the reading object region of the carrier sheet in which the original document is not pinched as the transparent portion being received by the reading unit. The deterioration degree of the carrier sheet can be more reliably detected based on light reception data regarding transmitted light which passes through a relatively wide region of the carrier sheet is received without being hidden by the original document. For example, although the light reception data is acquired at the transparent portion avoiding the original document in a carrier sheet in which the original document is pinched, since the light reception data can also be acquired with the region in which the original document is originally pinched as the transparent portion in a case of not pinching the original document, the deterioration degree can be more reliably detected.

In the image reading apparatus, it is preferable that the detector detect at least one of the transmissivity of the carrier sheet, the uniformity of the carrier sheet, and the discoloring of the carrier sheet based on the light reception data, and detect the deterioration degree based on the at least detected one.

According to the configuration, at least one of the transmissivity of the carrier sheet, the uniformity of the carrier sheet, and the discoloring in the carrier sheet is detected by the detector based on the light reception data, and the deterioration degree is detected based on the at least one thereof. Thus, the actual deterioration degree in response to the individual method of use for each carrier sheet can be better acquired than a case of detecting the deterioration degree based on the number of transports of the carrier sheet.

In the image reading apparatus, it is preferable that the process performed by the processor be an image correction process which corrects an image of the original document read by the reading unit in response to the deterioration degree of the carrier sheet.

According to the configuration, the image correction process which corrects the image of the original document read by the reading unit in response to the deterioration degree of the carrier sheet is performed by the processor. Thus, a favorable image of the original document with the influence of deterioration lowered or eliminated can be acquired even if the carrier sheet is deteriorated.

In the image reading apparatus, it is preferable that the image correction process include at least one of a gamma correction process and a fault removal process.

According to the configuration, at least one of a gamma correction process and fault removal process is carried out as the image correction process. Thus, an image of the original document with little influence from the deterioration degree of the carrier sheet can be acquired even if the carrier sheet is deteriorated.

It is preferable that the image reading apparatus further include a transport controller which corrects a transport speed when the carrier sheet is transported by the transport unit in response to the number of transports of the carrier sheet.

According to the configuration, the transport speed when the transport unit transports the carrier sheet is corrected by the transport controller in response to the number of transports of the carrier sheet. Thus, the carrier sheet can be transported at a desired transport speed by the transport unit even if the outer surface of the carrier sheet rubs in contact with the transport unit, and slipping arises due to changes in the frictional resistance between the carrier sheet and the transport unit, or, conversely, the frictional resistance increases due to the rubbing.

In the image reading apparatus, it is preferable that the transport controller perform correction which increases the transport speed when the carrier sheet is transported by the transport unit as the number of transports increases.

According to the configuration, the transport controller corrects the transport speed to increase when the carrier sheet is transported by the transport unit as the number of transports increases. For example, even if the carrier sheet slips with respect to the transport unit due to the friction of the outer surface thereof, the transport speed of the carrier sheet is not proportionally slowed. Thus, the original document can be read with a comparatively high image quality while transporting the carrier sheet at suitable transport speed proportionate to the slipping due to the friction of the carrier sheet generated.

It is preferable that the image reading apparatus further include a setting unit which sets the content of the processing based on the input information received.

According to the configuration, the setting unit can set the processing content associated with the identification information based on the input information received. Thus, the user can set desired content with respect to the process associated with the identification information performed by the processor.

According to an aspect of the invention, there is provided an image reading system including the image reading apparatus and a host driver that provides a reading instruction to the image reading apparatus, in which the host driver includes a setting unit that sets a content of the processing based on input information received.

According to the configuration, the content of the processing is set by the setting unit provided in the host driver based on the input information received. Thus, the user can set the processing of the processor to a desired content.

In the image reading system, it is preferable that the host driver further include a print processor that is able to generate printing information capable of printing at least the identification information from the registration information which includes the content of the processing set by the setting unit and identification information associated with the content of the processing on the joining section of the carrier sheet as a code.

According to the configuration, printing information which is able to print at least the identification information from the registration information which includes the processing content set by the setting unit and the identification information as a code on the joining section of the carrier sheet is generated by the print processor. Thus, the print processor can cause the code of the registration information to be printed on the joining section of the carrier sheet as a section to be read by outputting the generated printing information to the printing device. That is, the user can prepare the carrier sheet which has a section to be read on which the desired processing content and identification information is printed as a code.

In the image reading system, it is preferable that a short range wireless communication tag be provided at the joining section of the carrier sheet, the image reading apparatus include a writer unit that is able to write at least the identification information from the registration information which includes the content of the processing set by the setting unit and the identification information associated with the content of the processing to the short range wireless communication tag, and the identification information reading unit, and the identification information reading unit include a reader unit that reads the data of the identification information from the short range wireless communication tag.

According to the configuration, at least the identification information from the registration information which includes the processing content set by the setting unit and the identification information associated with the processing content is written to the short range wireless communication tag by the writer unit. The identification information reading unit reads at least the identification information with the reader unit from the short range wireless communication tag provided at the joining section of the carrier sheet. Thus, the user can write at least the identification information from the registration information which include the desired processing content and the identification information to the short range wireless communication tag, cause at least the identification information to be read by the reader unit of the image reading apparatus from the short range wireless communication tag provided at the joining section of the carrier sheet, and cause the process associated with the identification information to be performed by the processor.

BRIEF DESCRIPTION OF THE DRAWINGS

The invention will be described with reference to the accompanying drawings, wherein like numbers reference like elements.

FIG. 16 is a flowchart illustrating a carrier sheet deterioration degree determination process routine.

DESCRIPTION OF EXEMPLARY EMBODIMENTS

Below, an embodiment of an image reading apparatus will be described with reference to the drawings.

Figure 1:
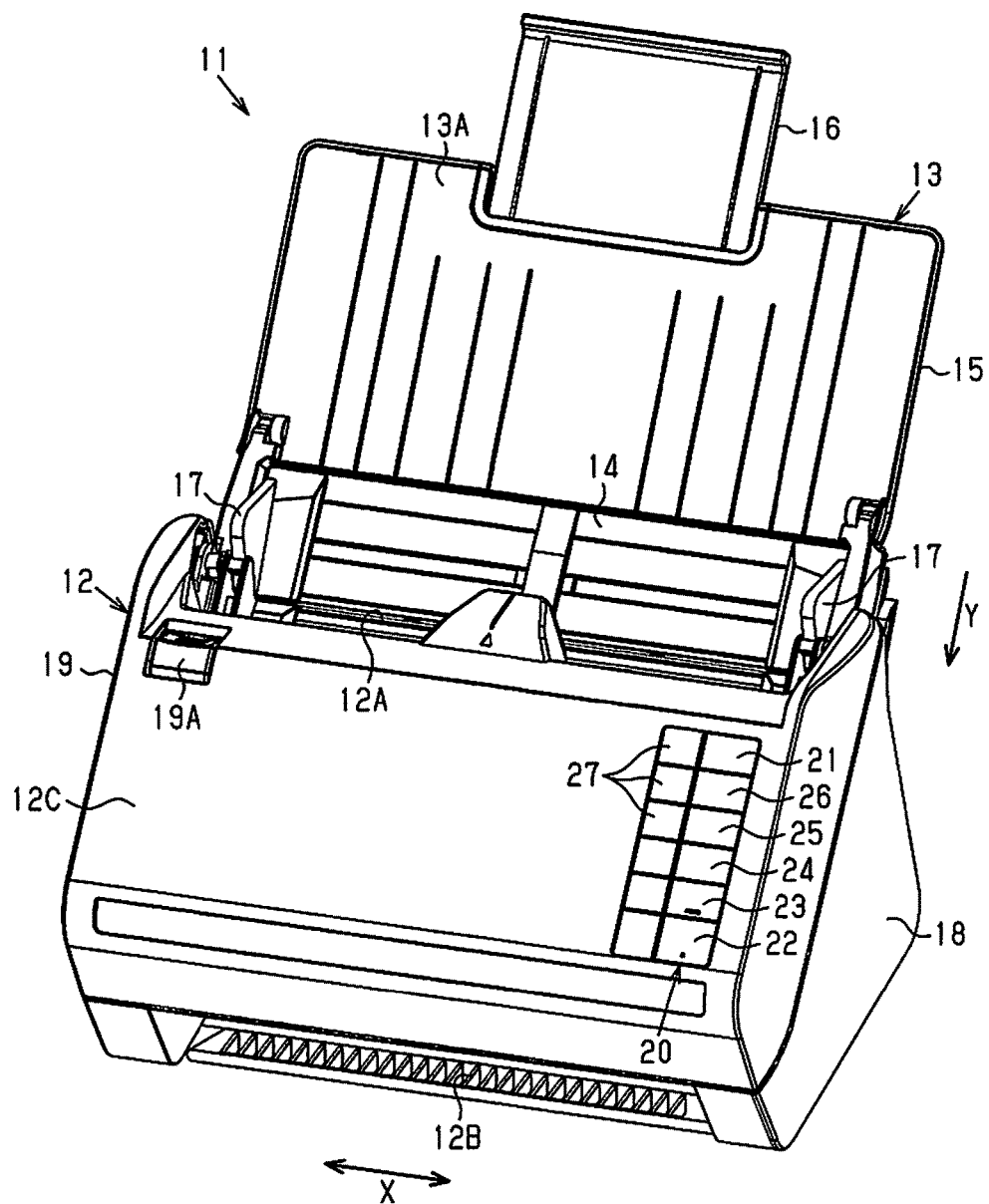
FIG. 1 is a perspective diagram illustrating an image reading apparatus in an embodiment.

As illustrated in FIG. 1, the image reading apparatus 11 of the embodiment is provided with an apparatus main body 12 (below, simply referred to as "main body 12") having a substantially trapezoidal shape in side view, and a document support 13 having a mounting surface 13A on which an original document D which is an image reading object and a carrier sheet CS, described later, with the original document D are mounted (set). Original documents D mounted on the document support 13 are fed one at a time to a feed port 12A which is open in the upper portion of main body 12. The fed original document D is transported along a predetermined transport path 32 (refer to FIG. 2) in the main body 12, discharged from a discharge port 12B open in the front side lower portion of the main body 12 after an image is read at a reading position partway through the transport thereof, and stacked on the discharge tray 18A (refer to FIG. 2). In the embodiment, an original document D such as a booklet document such as a passport or a bankbook and a folded document such as resume in which an A3 size sheet is folded in two is set on the document support 13 for each carrier sheet CS in a state where pinched by the colorless transparent carrier sheet CS, described later.

The document support 13 is provided with a first support unit 14 linked at the end portion (lower end portion) thereof to be rotatable with respect to the main body 12, and a second support unit 15 linked to be rotatable with respect to the upstream side in the feed direction Y (below, referred to as "transport direction Y") of the original document in the first support unit 14. An auxiliary support unit 16 able to retract by sliding is provided on the end portion on the upstream side in the feed direction of the second support unit 15. The document support 13 extends obliquely upward to the rear side of the main body 12 in a state where disposed in the open position illustrated in FIG. 1, and functions as a support on which the original documents are mountable. The document support 13 is compactly stored in a state where covering the upper surface portion and the front surface portion 12C of the main body 12 by being rotated in the forward direction of the sheet surface in FIG. 1 from the open position to the closed position by the user.

A pair of edge guides 17 which are able to slide in the width direction X to a position corresponding to the first support unit 14 in the transport direction Y is provided on the mounting surface 13A of the document support 13. The original document D is positioned in the width direction X with respect to the feed port 12A by pinching the original document D or the carrier sheet CS stacked on the mounting surface 13A with the pair of edge guides 17. It should be noted that the direction which intersects (in particular, is orthogonal to) the transport direction Y in which the original document D on the document support 13 is transported during image reading is the width direction X. The width direction X is the main scanning direction when the image reading apparatus 11 reads an image of the original document, and the transport direction Y is the sub-scanning direction.

Figure 2:
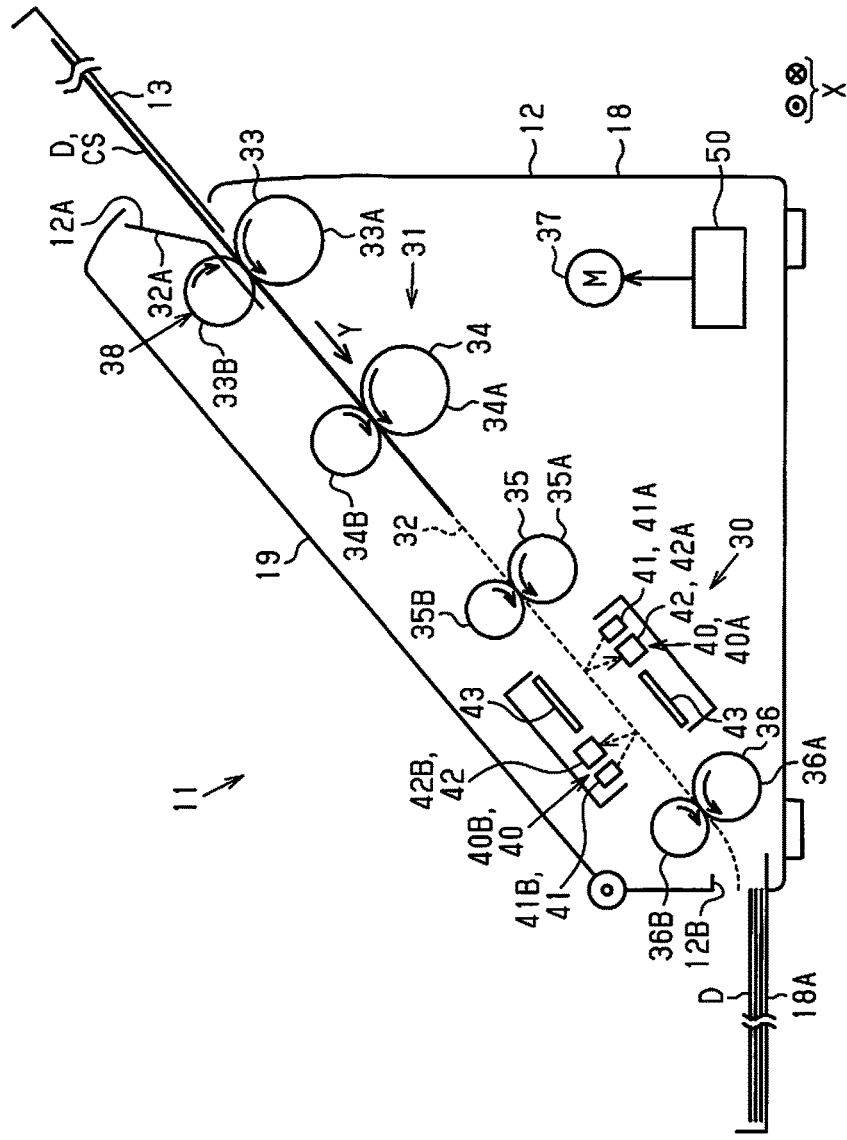
FIG. 2 is a schematic cross-sectional diagram illustrating the image reading apparatus.

As illustrated in FIGS. 1 and 2, the main body 12 is provided with a main body unit 18 and a cover unit 19 linked to be rotatable with respect to the main body unit 18 with the front end portion as a center. As illustrated in FIG. 2, a transport path 32 (refer to FIG. 2) which is able to transport the original document D or the carrier sheet CS from the feed port 12A to the discharge port 12B is formed between the main body unit 18 and the cover unit 19 in a state where the cover unit 19 is disposed at the closed position illustrated in FIGS. 1 and 2. The transport surface portion 39 (refer to FIG. 3) which forms the transport path 32 is exposed when the engagement between the cover unit 19 and the main body unit 18 is released by a user operating the operation unit 19A illustrated in FIG. 1 provided on the cover unit 19 and the cover unit 19 is rotated from the closed position illustrated in FIG. 1 to the open position in the forward direction of the sheet surface in FIG. 1. Removal of a paper jam (jam) of the original document D, maintenance of the fee and transport rollers 33A to 36A or the like (refer to FIG. 2) is performed by putting the transport surface portion 39 in the exposed state by opening the cover unit 19.

As illustrated in FIG. 1, an operation unit 20 is provided in the front surface portion 12C of the main body 12 (cover unit 19). The operation unit 20 is provided with a plurality of switches 21 to 26 which are operated by a user when instruction is provided to the image reading apparatus 11. Specifically, the operation unit 20 is formed from various switches such as a power switch 21, a start switch 22, a stop switch 23, a mode selection switch 24, a multiple feed detection deactivation switch 25 (multiple feed detection skip switch) and a wireless communication switch 26. The multiple feed detection deactivation switch 25 is operated when the multiple feed detection which detects the presence of a multiple feed in which the original document D is fed with a plurality of sheet overlapped in the main body 12 is deactivated, and multiple feed detection is not performed when deactivated. A notification unit 27 formed of a display lamp which is able to at least one of light and blink, and extinguish, or is able to change lighting color when lit with an LED or the like is provided at a position adjacent to the operation unit 20. The notification unit 27 notifies the user by lighting and extinguishing or changing the lighting color of the display lamp of the power being on or off, the mode currently selected, and whether the multiple feed detection is active or inactive.

As illustrated in FIG. 2, an image reading processing mechanism 30 which performs the image reading process (scanning process) is provided in the main body 12 of the image reading apparatus 11. The image reading processing mechanism 30 is provided with a transport unit 31 which transports the original document D. The transport unit 31 feeds a plurality of original documents D stacked on the document support 13 while guiding the documents one at a time from the feed port 12A into the main body 12 along the plate-like feed guide 32A, and transports the fed original document D at a fixed transport speed along the transport path 32.

The transport unit 31 is provided with a pair of feed roller pairs 33 disposed at an upstream end position of the transport path 32 in the main body 12, a pair of transport roller pairs 34 disposed closer to the downstream side in the transport direction the feed roller pair 33, a pair of transport roller pairs 35 disposed on the upstream side with the reading position of the original document D in the transport direction Y interposed, and a pair of transport roller pairs 36 disposed on the downstream side.

The feed roller pair 33 is formed of a driving roller 33A and a driven roller 33B. The transport roller pair 34 is formed of a driving roller 34A and a driven roller 34B. The transport roller pairs 35 and 36 are formed of driving rollers 35A and 36A and driven rollers 35B and 36B. Each driven roller 33B to 36B co-rotates with the driving rollers 33A to 36A which make up the respective pairs by means of the rotation thereof.

Each driving roller 33A to 36A which form the plurality of roller pairs 33 to 36 is driven to rotate by the driving force of a transport motor 37 which is the driving force source therefor. The driven roller 33B which forms the feed roller pair 33 is a retard roller, and the coefficient of friction with respect to the original document of the outer peripheral surface thereof is greater than the coefficient of friction with respect to the original document of the outer peripheral surface of the driving roller 33A. Therefore, the original documents are separated one at a time when passing between the feed roller pair 33. Thus, the plurality of original documents D stacked on the document support 13 by rotation of the feed roller pair 33 is fed one at a time in order from the lowermost document from the feed port 12A into the main body 12. When a booklet document or a folded document is fed as is, there is concern of being fed shifted due to the separating action of the separating mechanism 38 which includes a retard roller. Therefore, when a user scans the original document D such as a booklet document or a folded document, the original document D is set on the document support 13 interposed by the carrier sheet CS (refer to FIG. 4).

As illustrated in FIG. 2, a pair of reading units 40 disposed on both sides with the transport path 32 interposed is provided at the reading position partway along the transport path 32 formed by the feed roller pair 33 and each transport roller pair 34 to 36 in the main body 12. That is, the pair of reading units 40 is formed of a first reading unit 40A and a second reading unit 40B, and the reading units are disposed at positions slightly shifted enough in the transport direction Y to not face one another on both sides with the transport path 32 interposed. The pair of reading units 40 is formed of a light source 41 which is able to irradiate the original document D with light during transport and an image sensor 42 which extends in the main scanning direction (width direction X). The first reading unit 40A performs a reading operation during the normal reading mode in which one surface (front surface) of the original document D is read, and both the first reading unit 40A and the second reading unit 40B perform the reading operation during duplex reading mode in which both surfaces (front and back surfaces) of the original document D are read.

The light source 41 is formed of an LED, a fluorescent lamp or the like. The image sensor 42 receives reflection light in which light radiated from the light source 41 is reflected by the original document D or the like, and outputs an image signal with a value in response to the amount of received light while converting the received light to an electrical signal. The image sensor 42 is a linear image sensor. The image reading apparatus 11 is capable of color scanning and monochrome scanning (gray scale scanning). Color scanning methods include a method where the image sensors are monochrome and acquire, in order, image signals of each RGB color from an image sensor while the light sources of each RGB color are caused, in order, to emit light in time series, and method where photoelectric conversion elements of each RGB color in which the image sensors are covered by a color filter, and each RGB image signal is acquired from each element while a white light source is caused to emit light. The color scanning method may be of either method. It should be noted that there are cases where the light source 41 and image sensor 42 indicate those on the first reading unit 40A side and are denoted by the first light source 41A and the first image sensor 42A, and where those on the second reading unit 40B side are indicated and denoted by the second light source 41B and the second image sensor 42B.

A color reference plate 43 is disposed as an example of a color reference section at a position facing the image sensor 42 with the transport path 32 interposed. Since the color reference plate 43 is for obtaining the white reference value for shading correction, a white reference plate printed with white or a gray reference plate printed with gray is used. In this example, a gray reference plate is employed as the color reference plate 43. Use of the gray reference plate is in order to detect the original document D from the read data based on a difference in colors (for example, color difference) or a difference in brightness values between the original document and the background in the read data read with the color reference plate 43 as the background of the original document. It should be noted that the color reference plate 43 may be a white reference plate in a case of a configuration provided with a sensor dedicated to document detection and which detects an original document.

The image sensor 42 is a contact-type image sensor disposed in which a plurality of photoelectric conversion elements are disposed in a row along the scanning direction X. The image sensor 42 is more specifically a complementary metal oxide semiconductor (CMOS) image sensor. The image sensor 42 outputs pixel signals with a value in response to the amount of received light while photoelectrically converting light which is received by each of the photoelectric conversion elements.

The transport motor 37, and the light sources 41 and image sensors 42 that form the reading units 40 (40A and 40B) are controlled by the controller 50 provided in the main body 12. The controller 50 inputs operation signals from the operation unit 20 operated by a user, and controls the image reading apparatus 11 based on instructions provided by the operation signals.

Figure 3:
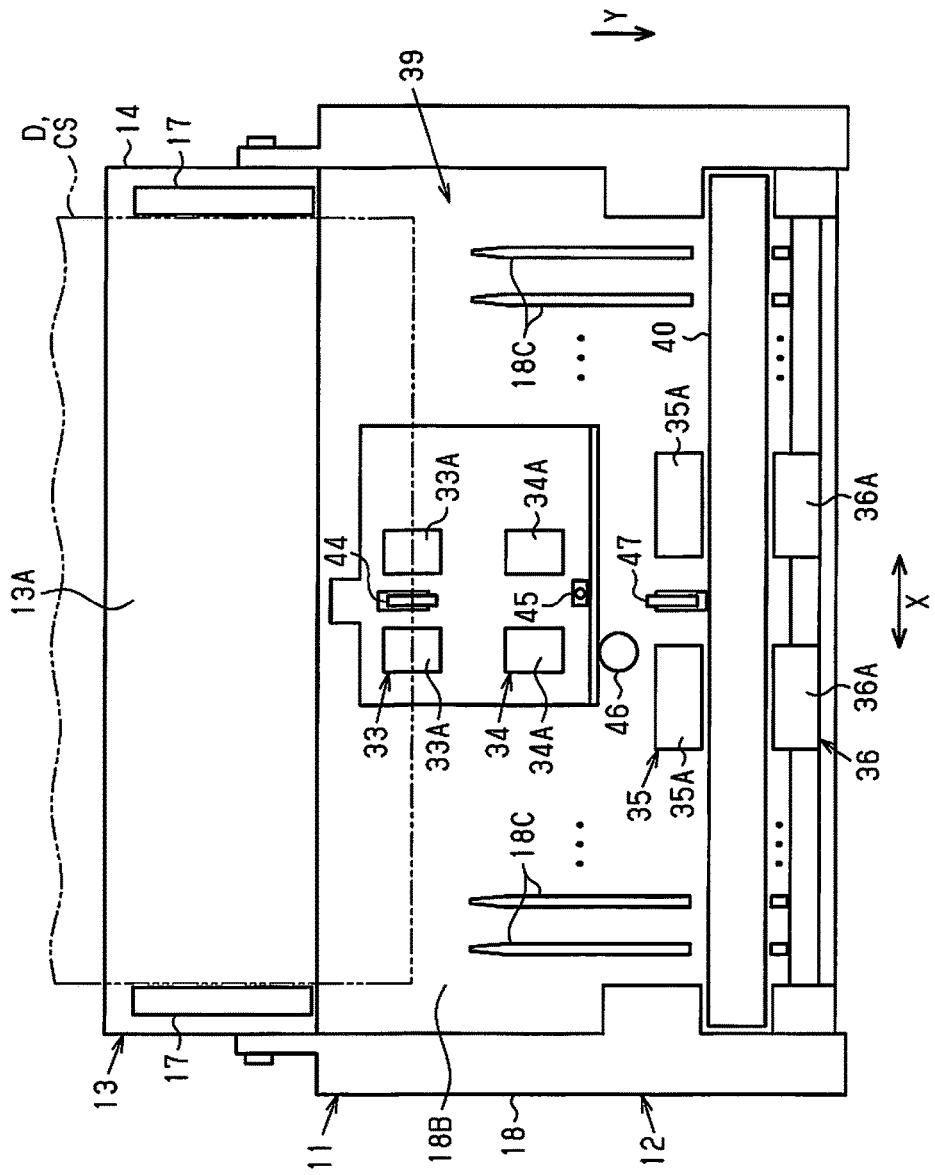
FIG. 3 is a schematic plan diagram illustrating a transport surface portion of a main body unit.

Next, the transport surface portion 39 which forms the surface portion which on the lower side from the transport path of original document will be described with reference to FIG. 3. As illustrated in FIG. 3, the transport surface portion 39 which is the surface portion on the lower side of the transport path 32 formed by the upper surface of the main body unit 18 is provided with a transport plate 18B which has a plurality of ribs 18C which cover the upper surface of the main body unit 18 and which extend parallel to each other along the transport direction Y on the upper surface. In substantially the central portion in the width direction X in the transport surface portion 39, the driving roller 33A which forms the feed roller pair 33 and each driving roller 34A to 36A which form the transport roller pairs 34 to 36 are disposed, in order from the upstream side in the transport direction Y, one pair at a time spaced by a small gap from one another in the width direction X. The document sensor 44 is disposed between the pair of driving rollers 33A. The document sensor 44 is a contact-type sensor having a lever, and detects the presence or absence of the original document D which is the reading object by the lever being pressed by the original document D or the carrier sheet CS set on the document support 13.

A carrier sheet sensor 45 (below, simply referred to as "CS sensor 45") is disposed between the pair of driving rollers 34A. The CS sensor 45 is an optical-type sensor and detects the carrier sheet CS optically distinguishing the original document D and the carrier sheet CS.

A multiple feed sensor 46 is disposed at a position slightly to the downstream side of the CS sensor 45 at a position between the driving roller 34A and the driving roller 35A in the transport direction Y. The multiple feed sensor 46 is an ultrasound-type sensor, and is provided with a transmitter which is able to transmit ultrasonic waves and a receiver which is able to receive ultrasonic waves and is disposed facing the transmitter with the transport path 32 interposed. The multiple feed sensor 46 detects a multiple feed of the original document D using the principle that ultrasonic waves propagated from the transmitter to the receiver are attenuated by the gap between the two original documents D which are multiply fed. In a case where the degree of attenuation of the ultrasonic waves when two or more original documents pass through, since the degree thereof is high, a multiple feed is detected. Meanwhile, when one original document D is transported, since the degree of attenuation of the ultrasonic waves is low when the document passes through, a multiple feed is not detected. The sheet portion 52 other than the joining section 51 of the carrier sheet CS is formed of two sheets, and because the degree of attenuation by which the ultrasonic waves attenuate in the gap between the two sheet portions 52, the multiple feed sensor 46 erroneously detects the carrier sheet CS as a multiple feed of the original document. Therefore, the user disables multiple feed detection by operating the multiple feed detection deactivation switch 25 when the original document D is read interposed by the carrier sheet CS. In the embodiment, even if the multiple feed detection is enabled without operating the multiple feed detection deactivation switch 25 in advance, the multiple feed detection is disabled by the controller 50 when the CS sensor 45 detects the carrier sheet CS.

The document presence sensor 47 is disposed between the pair of driving rollers 35A which form the transport roller pair 35. The document presence sensor 47 is a contact-type sensor having a lever, and detects the front edge by the front edge of the original document D or the carrier sheet CS pushing the lever, thereby the switching from a non-detection state to a detection state, and detects the rear edge by the rear edge passing through and the level not being pushed, thereby switching from the detection state to the non-detection state. The detection results of the document presence sensor 47 is used in control of the timing of the start and finish of the reading operation of the reading units 40 (40A and 40B) disposed to the downstream side in the transport direction Y.

Figure 4:
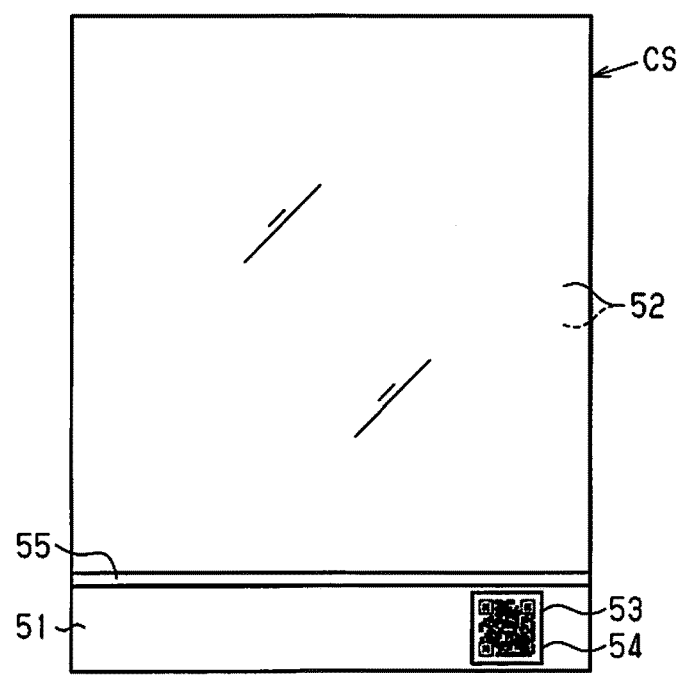
FIG. 4 is a schematic plan diagram illustrating a carrier sheet with an attached two-dimensional code.
Figure 5:
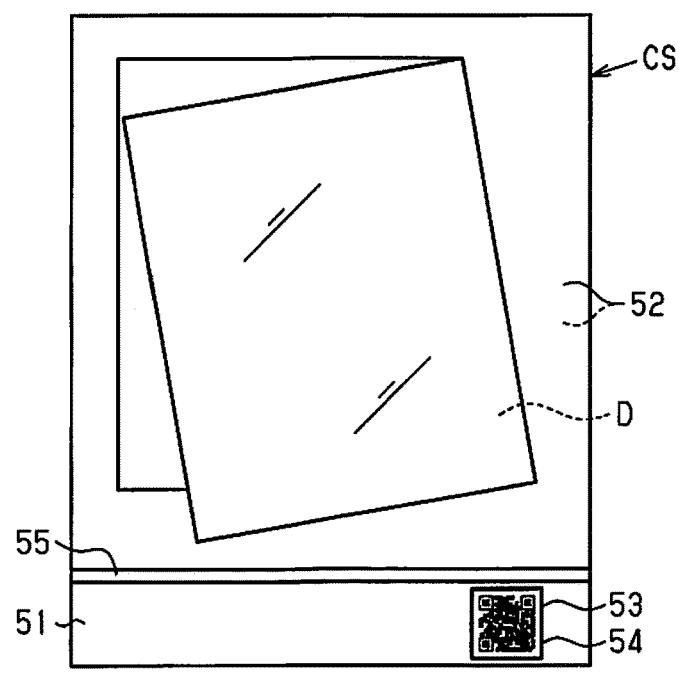
FIG. 5 is a partially cutaway schematic plan diagram illustrating a carrier sheet in which an original document is pinched.

Next, the carrier sheet CS will be described with reference to FIGS. 4 and 5. As illustrated in FIG. 4, the carrier sheet CS includes a joining section 51 which joins two squareshaped sheets formed of an uncolored transparent synthetic resin at a portion of the peripheral edge portion thereof, and two sheet portions 52 which extend from the joining section 51. The carrier sheet CS is used with the original document D interposed between two sheet portions 52 as illustrated in FIG. 5. The carrier sheet CS is used set on the document support 13 oriented so the joining section 51 side becomes the leading end in the transport direction Y. That is, the carrier sheet CS with the original document D interposed is set in a state where the leading edge portion on the joining section 51 side inserted in the feed port 12A, and fed to the main body 12 from the joining section 51 side.

As illustrated in FIGS. 4 and 5, a section to be read 53 on which registration information which includes the identification information (individual identification information) which is able to identify an individual carrier sheet CS is recorded in a readable state is provided at the joining section 51 of the carrier sheet CS. FIGS. 4 and 5 are examples in which the section to be read 53 is a two-dimensional code 54. A two-dimensional code is provided at the joining section 51 through printing or attaching a sticker. In this example, a QR code (registered trademark) is employed as the two-dimensional code 54. The two-dimensional code 54 as a section to be read 53 is read by the reading unit 40. The read two-dimensional code is decrypted by the controller 50. The controller 50 acquires the registration information which includes the identification information while decrypting the two-dimensional code.

The transparent window section 55 is provided at a portion corresponding to the boundary portion between the joining section 51 and the sheet portion in the carrier sheet CS of the embodiment. The transparent window section 55 is formed in a region between the line-like joining section location and the joining section 51 with the sheet portions 52 joined in a line shape to each other at a position separated from the joining section 51 by the width of the window. The section to be read 53 may be a known two-dimensional code 54 other than a QR code or may be a one-dimensional code such as a bar code. The section to be read 53 may be provided on only one surface of the joining section 51 of the carrier sheet CS, or may be provided on both surfaces. A plurality of sections to be read 53 may be provided per single surface of the carrier sheet CS.

Figure 6:
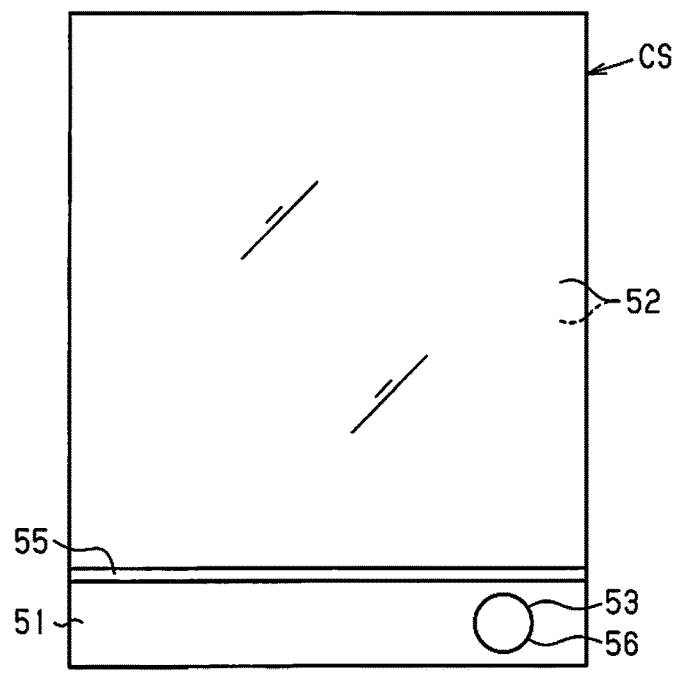
FIG. 6 is a schematic plan diagram illustrating a carrier sheet with an attached NFC.
Figure 7:
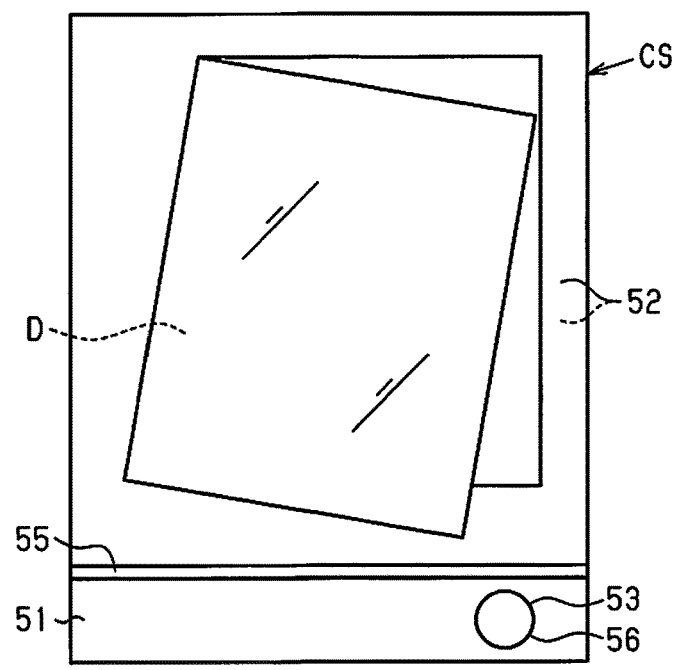
FIG. 7 is a schematic plan diagram illustrating a carrier sheet in which an original document is pinched.

In the example of the carrier sheet CS illustrated in FIGS. 6 and 7, an NFC tag 56 is provided as an example of the short range wireless communication tag as a section to be read 53 on the joining section 51. In a case where the section to be read 53 is an NFC tag 56, an NFC reader 57 (refer to FIG. 8A) is provided as an example of a reader unit which is able to read the NFC tag 56 at a position partway along the transport path 32 of the image reading apparatus 11. The NFC reader 57 is able to read the registration information which include the identification information of the individual carrier sheet CS from the NFC tag 56 during transport of the carrier sheet CS. An NFC writer 58 (refer to FIG. 8A) as an example of a writer unit which is able to write information to the NFC tag 56 is provided at a position partway along the transport path 32 in the image reading apparatus 11 of the embodiment. The NFC writer 58 may be provided at a predetermined location on the outer peripheral surface of the main body 12. It should be noted that there may be no NFC writer 58. In the model corresponding to only the carrier sheet CS illustrated in FIG. 4, there may be no NFC reader 57.

Figure 8A:
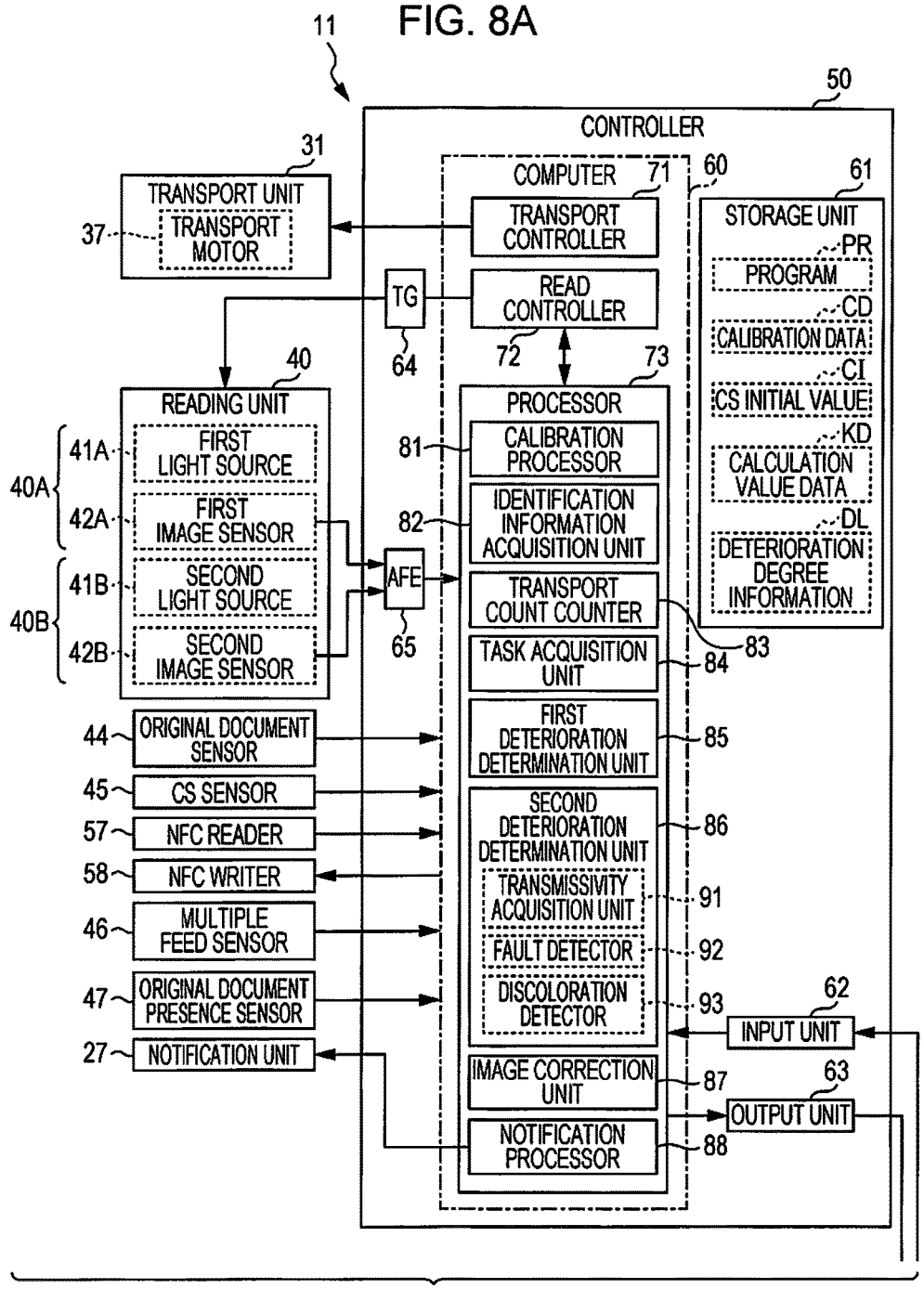
FIGS. 8A and 8B are block diagrams illustrating an electrical configuration and a functional configuration of the image reading apparatus.

Next, the electrical configuration of the image reading apparatus 11 will be described with reference to FIG. 8A. As illustrated in FIG. 8A, the controller 50 is provided with a computer 60 formed of a microprocessor or the like, a storage unit 61, an input unit 62 formed of an input interface which inputs various data items or signals from an external host device 100 and an output unit 63 formed of an output interface which outputs read data read by the image reading apparatus 11 to the host device 100. The controller 50 is further provided with a timing generator 64 (below, denoted by "TG 64") which outputs a pulse signal which stipulates the various operation timings which include the reading operation of the pixel signals with respect to the image sensors 42A and 42B and an analog front end 65 (below, denoted by "AFE 65") which subjects the pixel signal input from the image sensors 42A and 42B to analog-to-digital conversion (A/D conversion). The storage unit 61 is formed of a nonvolatile memory and a RAM.

The image reading apparatus 11 is connected to the host device 100 through a communication cable. The host device 100 is formed of a personal computer (below, also referred to as a "PC") and is provided with an input unit 101 and a display unit 102. It should be noted that the host device 100 is not limited to a PC, and may be a smart device such as a portable information terminal (personal digital assistant (PDA)), a tablet PC or a smartphone.

Figure 8B:
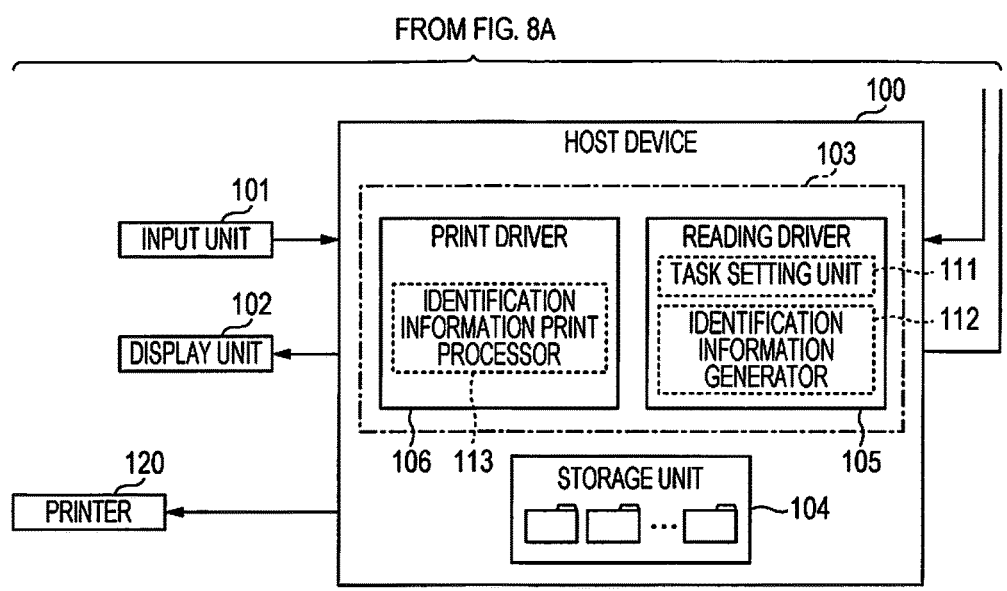

As illustrated in FIG. 8B, the host device 100 has a computer 103 and a storage unit 104 built-in. The computer 103 is provided with a reading driver 105 and a print driver 106. The reading driver 105 and the print driver 106 are formed by software installed on the host device 100 and form an example of a host driver in the embodiment.

The reading driver 105 is provided with a task setting unit 111 as an example of a setting unit and an identification information generator 112. The task setting unit 111 receives the input information which includes conditions designated by the user with the operation of the input unit 101, and sets the processing content performed by the image reading apparatus 11. In this example, the task setting unit 111 sets the conditions of the task (task conditions) as the processing content. The task conditions include at least one of reading conditions which include resolution, reading color (monochrome/color) or the like, image correction conditions which include the conditions of the image correction process in which the faults such as scratching and the discolored color are reduced or eliminated or the stitching orientation (orientation of the fold) when two images of the folded document are joined, and save conditions which include the save format of the image data and the save destination. The task setting unit 111 is provided in the image reading apparatus 11, for example, a computer 60, and a configuration may be used where the task setting unit 111 in the image reading apparatus 11 sets the conditions of the task (task conditions) based on the conditions designated by the user with the operation of the operation unit 20 or the input unit 101.

The identification information generator 112 generates the registration information which includes at least the identification information able to identify the individual carrier sheet CS. The registration information which includes the identification information generated by the identification information generator 112 is transmitted from the host device 100 to the image reading apparatus 11.

When the user inputs that the registration information which includes the identification information is to be formed on a carrier sheet CS on which a two-dimensional code is not formed to the input unit 101, and the registration information is sent from the reading driver 105 to the print driver 106. In the print driver 106, the identification information print processor 113 as an example of the print processor generated the two-dimensional code based on the registration information which includes the identification information, and generates the print data which is able to print the two-dimensional code 54 at a predetermined location on the joining section 51 of the carrier sheet CS. The printing data is transmitted from the host device 100 to the printer 120 (printing device) on which the carrier sheet CS is set. The carrier sheet CS having the two-dimensional code 54 illustrated in FIG. 4 is generated by the printer 120 printing the two-dimensional code 54 at the joining section 51 of the carrier sheet CS based on the printing data. The reading driver 105 may generate the two-dimensional code based on the registration information. That the user wishes the registration information which includes the identification information to be formed on the carrier sheet CS on which a two-dimensional code is not formed and the necessary input information may be input with an operation of the operation unit 20 of the image reading apparatus 11.

When that the user wishes at least the registration information which includes the identification information be written to the NFC tag 56 illustrated in FIG. 6 is input to the input unit 101, the registration information is transmitted from the host device 100 to the image reading apparatus 11. The user causes the NFC tag 56 of the carriers sheet CS to approach the NFC writer 58 close enough to enable short range wireless communication by causing the carrier sheet CS on which the registration information is not registered to be transported by the image reading apparatus 11 or to be touched to a predetermined location on the main body 12 according to a message displayed on the host device 100. As a result, short range wireless communication between the NFC writer 58 and the NFC tag 56 is established, and the computer 60 in the image reading apparatus 11 controls the NFC writer 58, thereby writing the registration information to the NFC tag 56. Thus, the carrier sheet CS on which the registration information is written to the NFC tag 56 illustrated in FIG. 6 is generated. That the registration information is to be written to the NFC tag 56 and the necessary input information may be input with an operation of the operation unit 20 of the image reading apparatus 11. The carrier sheet CS illustrated in FIGS. 4 and 6 is not limited to being generated with the above method, and the registration information which includes the identification information may be registered in the section to be read 53.

Figure 15:
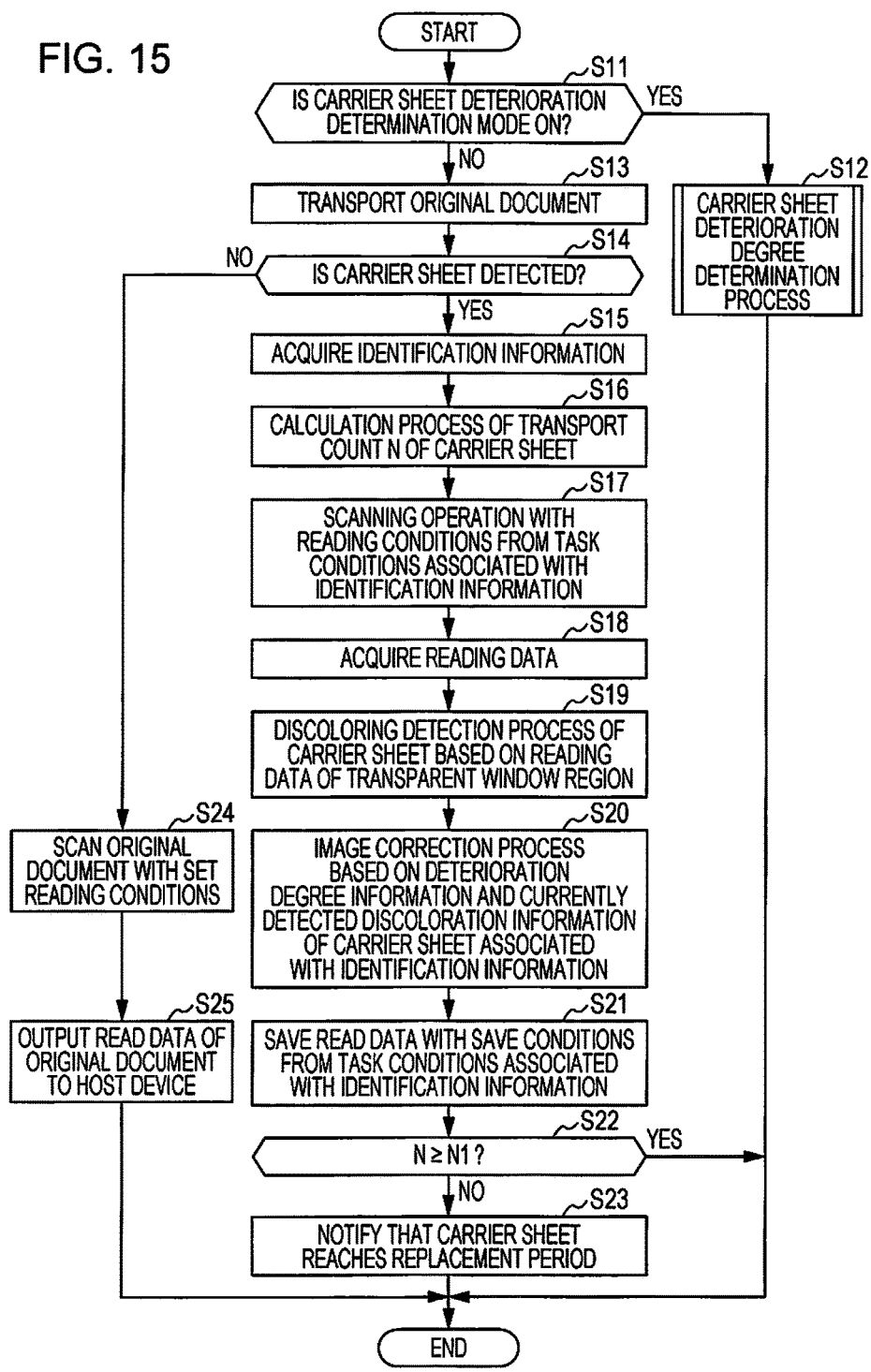
FIG. 15 is a flowchart illustrating a carrier sheet deterioration detection process.

A program PG which includes a reading control program and calibration data CD illustrated in the flowcharts in FIGS. 15 and 16 are stored in the storage unit 61 illustrated in FIG. 8A. The calibration data CD is used when correcting the read data of the reading unit 40 from which influences such as individual differences in the light sources 41 and image sensors 42 or deterioration over time is to be removed. The CS initial value CI, the count value data KD, and the deterioration degree information DL are stored in the storage unit 61 by the computer 60. The CS initial values CI is applied with initial color data obtained by light from the light source 41 passing through the carrier sheet CS during usage start, and the color reference plate 43 being read. The CS initial values CI is used as a reference when detecting discoloration due to deterioration over time of the carrier sheet CS. The count value data KD is a count value which indicates the number of transports (number of uses) of the carrier sheet CS passing through (transported by) the transport path 32. The deterioration degree DL is information pertaining to the determined deterioration degree of the carrier sheet CS.

The computer 60 illustrated in FIG. 8A is provided with a transport controller 71, a reading controller 72, and a processor 73 as functional units which function by executing the program PG.

The transport controller 71 drives and controls the transport motor 37 provided in the transport unit 31 as a power source. The transport controller 71 causes the plurality of original documents D set on the document support 13 to be supplied into the main body 12 one at a time and transported at a constant transport speed along the transport path 32 by driving the transport motor 37 according to the instructions, thereby causing the plurality of roller pairs 33 to 36 to rotate.

The reading controller 72 controls the generation of light by the light source 41 and irradiates the original document D with light. During transport, the reading controller 72 controls the reading unit 40 and causes the image of the original document D to be read. Specifically, the reading controller 72 controls the reading operation by outputting a pulse signal which controls the operation timing or the like of the reading operation of the image signals with respect to the image sensor 42 via the TG 64. The analog pixel signal input from the image sensor 42 is converted to a digital pixel signals vial the AFE 65 and input to the processor 73 as read data.

The processor 73 carriers out correction processing, such as shading correction and gamma correction, on the read data formed of the input digital pixel signal, and generates the image data of the original document D. At this time, the processor 73 performs different image correction processes in a case of an original document D and a case of a carrier sheet CS with the original document D pinched. For example, in a case of an original document, an ordinary image correction process is performed and image data of the original document D is generated. Meanwhile, in a case of a carrier sheet CS, the region of the original document D is cut out from the read data, and the image correction process which removes the influence of the carrier sheet CS from the image data of the cut out region. And the image data of the original document D is generated.

The processor 73 performs processing associated with identification information of the carrier sheet CS obtained by reading the section to be read 53 of the carrier sheet CS. The processor 73 performs read processing in which the reading unit 40 is caused to read the original document D pinched by the carrier sheet CS with task conditions associated with the identification information of the carrier sheet CS. In other words, in a case where the user is to cause the original document D in predetermined task conditions pinched by the carrier sheet CS, the original document D is read using the carrier sheet CS having a dedicated section to be read 53. The identification information associated with the task conditions is at least registered in the section to be read 53. Thus, the user can cause the original document D to be read in suitable task conditions matching the individual carrier sheet CS.

The processor 73 acquires information on the deterioration degree (deterioration degree information) of the carrier sheet CS associated with the identification information acquired by reading the section to be read 53 of the carrier sheet CS each time the carrier sheet CS is transported. There of two types of acquisition method of the deterioration degree. One method acquires the accumulated number of transports from the usage state time by a counter counting "1" at a time each time the carrier sheet CS is transported, and acquires the deterioration degree which increases as the number of transports indicated by the calculated value increases. The other method acquires at least one of the light transmissivity of the carrier sheet CS, the uniformity and information pertaining to discoloration based on the read data obtained by the reading unit 40 reading the transparent portion of the carrier sheet CS, and acquires the deterioration degree of the carrier sheet CS based on at least one thereof. In particular, in the example, the deterioration degree of the carrier sheet CS is acquired with overall reference to information items pertaining to all three of transmissivity, uniformity, and discoloring.

The processor 73 performs various processes in response to the deterioration degree of the carrier sheet CS in a case where the reading object is the carrier sheet CS. As an example of one type processing, the processor 73 notifies the user of the replacement period with the notification unit 27 if the deterioration degree reaches the threshold, and notifies the user through the display of a message indicating the replacement period on the display unit 102 of the host device 100. There are also cases of performing notification of the deterioration degree of the carrier sheet CS, as necessary. When the deterioration degree reaches the threshold or higher, the processor 73 notifies the user of the replacement period (lifetime) by lighting or blinking the display lamp and displaying a message on the display unit 102 of the host device 100. The processor 73 further performs the image correction process which removes the influence of deterioration of the carrier sheet CS from the read data as another example of the kinds of processes.

As illustrated in FIG. 8A, the processor 73 is further provided with a calibration processor 81, an identification information acquisition unit 82, a transport number counter 83, a task acquisition unit 84, a first deterioration determining unit 85, a second deterioration determining unit 86, an image correction unit 87, and a notification processor 88 in order to perform the various processes. A fault detector 92 that detects faults such as scratches on the carrier sheet CS, transferred contamination or dust, and a discoloration detector 93 that detects discoloration of the transparent sheet portion 52 of the carrier sheet CS. It should be noted that, in the embodiment, an example of identification information reading unit is formed by the reading unit 40, the NFC reader 57, and the identification information acquisition unit 82. An example of the detector is formed by the transport number counter 83 and the first deterioration determining unit 85. An example of the detector is formed by the second deterioration determining unit 86.

The calibration processor 81 reads the color reference plate 43 with the light source 41 and image sensor 42 when the light source of the image reading apparatus 11 is powered on, and performs calibration in response to the progress of the deterioration or the like due to temperature dependency or change over time in the characteristics of the light source 41 and the image sensor 42. The calibration processor 81 performs calibration as follows. Calibration is performed according to the current temperature of the light source 41 and the image sensor 42 and the extent of the changes over time using the white reference data and the gray reference data set at the delivery inspection of the image reading apparatus 11, and the color data (for example, gray data) obtained by the reading unit 40 reading the color reference plate 43 (for example, gray reference plate) each time the image reading apparatus 11 is powered on.

The calibration data CD used during the calibration process is stored in the storage unit 61. The gray data GR and the white data WR are included in the calibration data CD. The data GR and WR are acquired as outlined below during factory delivery. The color reference plate 43 is read by the image sensor 42, thereby acquiring the color reference data (gray reference data GS0), and a white reference chart is read by the image sensor 42, thereby acquiring the white reference data WS0. The image sensor 42 performs the reading operation with the light source 41 in the extinguished state, thereby acquiring the black reference data KS0. The color data (gray data GR0 (=GS0−KS0)) and the white data (WR0=WS0−KS0) are acquired from these data. The calibration data thereby acquired is stored in advance in the storage unit 61.

The calibration processor 81 acquires the current gray reference data GS1 by causing the image sensor 42 to read the color reference plate 43 directly after the image reading apparatus 11 is powered on, and acquires the current black reference data KS1 by the reading operation being performed by the image sensor 42 with the light source 41 in the extinguished state. The current gray data GR1 (=GS1−KS1) is acquired using the data. Next, the calibration processor 81 calculates the current white data WR1 using the equation WR1=GR1·WR0/GR0. The calibration processor 81 stores the calibration results in which calibration is performed when the light source of the image reading apparatus 11 is powered on in the storage unit 61 as a CS initial value CI associated with the identification information of the carrier sheet during the initial use of the carrier sheet CS.

In a case where the section to be read 53 of the carrier sheet CS is a two-dimensional code 54 (refer to FIG. 4), the identification information acquisition unit 82 acquires the registration information which includes the identification information with the two-dimensional code information in which the reading unit 40 reads the two-dimensional code 54 decrypted. In a case where the section to be read 53 of the carrier sheet CS is an NFC tag 56 (refer to FIG. 6), the registration information which includes the identification information in the data is acquired by the NFC reader 57 reading the data from the NFC tag 56.

The transport number counter 83 performs the count process which increments the count by "1" each time the identification information is acquired when the carrier sheet CS passes through the transport path 32. The count value of the transport number counter 83 is stored, in a state associated with the identification information, in a predetermined storage region of the storage unit 61 as a finishing process when the power source of the image reading apparatus 11 is disconnected. Therefore, the count value during the previous power source disconnection is set in the transport number counter 83 when the image reading apparatus 11 is powered up. The transport number counter 83 writes the count value up to that point to the predetermined region of the storage unit 61 associated with the identification information each time the identification information is switched, and sets the value thereof in the transport number counter 83 by reading out the number of transports associated with the switched identification information.

The task acquisition unit 84 acquires the task conditions associated with the identification information. There are cases of including the identification information which is able to identify the individual carrier sheet CS and the information (task condition information) pertaining to the task conditions associated with the identification information in the registration information registered in the section to be read 53, and cases of not including the task conditions. In a case where the task condition information is not included, the task condition information associated with the identification information is stored in the predetermined storage region of the storage unit 61 for each identification information item. The task acquisition unit 84 acquires the task condition information associated with the identification information read by the identification information acquisition unit 82 from the registration information read from the section to be read 53 or by reading out the identification information from the predetermined storage region of the storage unit 61. Here, the task conditions include at least one from the reading resolution, the reading color, the stitching orientation (orientation of the fold) in the case of the folded document, and the save format and save destination of the image data. In particular, in the embodiment, all of the reading resolution, the reading color, the stitching orientation in the case of a folded document, and the save format and save destination of the read data can be set as the task conditions.

The reading resolution was set to 300 dpi and 600 dpi. The reading color includes color and monochrome (gray scale). The stitching orientation of the folded document includes a right orientation in which the stitching (fold) comes on the right side and a left orientation where the stitching comes on the left side in a case where the carrier sheet CS is set to one orientation determined in advance from the front and back (for example, the front surface faces downward) and fed with respect to the document support 13. In the save destination of the read data, one of the plurality of folders in the storage unit 104 on the host device 100 side is selected as the save destination of the read data. One data format which is determined in advance from various data formats used as the format for data of an image of the original document read by the image reading apparatus 11, such as a pdf format or a bitmap format is selected for the save format.

The first deterioration determining unit 85 determines that the carrier sheet CS specified by the identification information exceeds the lifetime which capable of suitable use by exceeding the upper limit of the number of uses thereof by having an accumulated number of transports from the usage start indicated by the count value of the transport number counter 83 reaches the threshold number or more.

The second deterioration determining unit 86 determines the deterioration degree of the carrier sheet CS based on the read data (light reception data) obtained by receiving the transmitted light which passes through the reading object region SA of the carrier sheet CS not pinching the original document when the carrier sheet deterioration determining mode is ON. Specifically, the second deterioration determining unit 86 performs transmissivity determination which determines the deterioration degree of the carrier sheet based on the light transmissivity of the carrier sheet CS acquired based on the read data, deterioration determination which determines the uniformity of whether the brightness of the carrier sheet CS is entirely uniform, and discoloration determination which determines the discoloration, such as yellowing, of the carrier sheet CS. Although it is naturally determined that the uniformity is high if there are absolutely no faults, discoloring, clouding or the like in the carrier sheet CS, it is determined that there is uniformity even if there are faults, discoloring, clouding or the like in a case where these are uniformly distributed. Meanwhile, in a case where a comparatively large fault is present, or a case where even minute faults such as abrasions biases at a plurality of specified locations.

The second deterioration determining unit 86 is provided with a transmissivity acquisition unit 91, a fault detector 92, and a discoloration detector 93 used in the deterioration determination of the carrier sheet CS.

The transmissivity acquisition unit 91 acquires the light transmissivity based on the data read by the image sensor 42 or the CS sensor 45. For example, there are cases where there is overall discoloring of the carrier sheet CS due to light such as ultraviolet rays or overall clouding of the carrier sheet CS due to fine abrasions. Therefore, the deterioration degree of the carrier sheet CS due to discoloring or clouding is ascertained according to the light transmissivity. Here, the image sensor 42 is able to acquire the distribution of the light transmissivity in all regions of the carrier sheet CS in contrast to the CS sensor 45 being only able to acquire the local light transmissivity of the carrier sheet CS. Therefore, the transmissivity acquisition unit 91 of the embodiment employs the latter and acquires the distribution of the light transmissivity in all regions of the carrier sheet CS based on the read data. The uniformity is also determined according to the distribution of the light transmissivity.

The second deterioration determining unit 86 uses the distribution data of the light transmissivity, and detects the deterioration degree of the carrier sheet CS in response to the average transmissivity in which the light transmissivity is averages for all regions of the reading object region SA of the carrier sheet CS. When the average transmissivity lowers to a threshold or lower, the replacement period (lifetime) of the carrier sheet CS is determined. Rather than using the average transmissivity, the replacement period of the carrier sheet CS may be determined when the proportion of the area for which the transmissivity reaches a threshold or lower reaches the threshold or higher.

Figure 9:
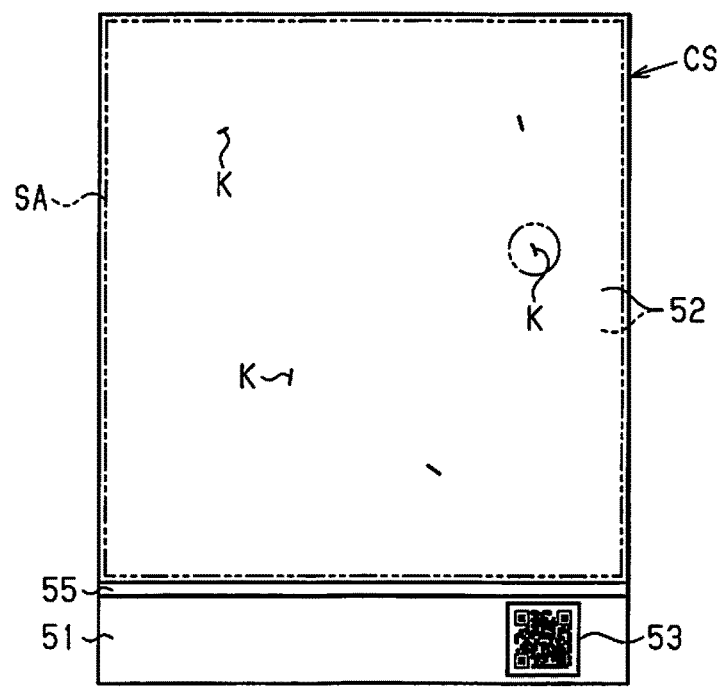
FIG. 9 is a schematic plan diagram describing a fault due to deterioration of the carrier sheet.

The fault detector 92 detects faults such as scratching or folding or the carrier sheet CS and transferred contamination based on the read data. The fault detector 92 subjects the image data of the reading object region SA surrounded by the double dotted line on the carrier sheet CS illustrated in FIG. 9 to binarization processing at a fault detection threshold. The results of the binarization process are that fault K (fault region) of less that the first threshold SK1, such as scratching or transferred contamination of the carrier sheet CS, appears black as illustrated in FIG. 9. Although not illustrated, a fault K in which the second threshold SK2 (>SK1) such as scratching of the carrier sheet CS, transferred contamination, or folding is exceeded appears white.

Figure 10:
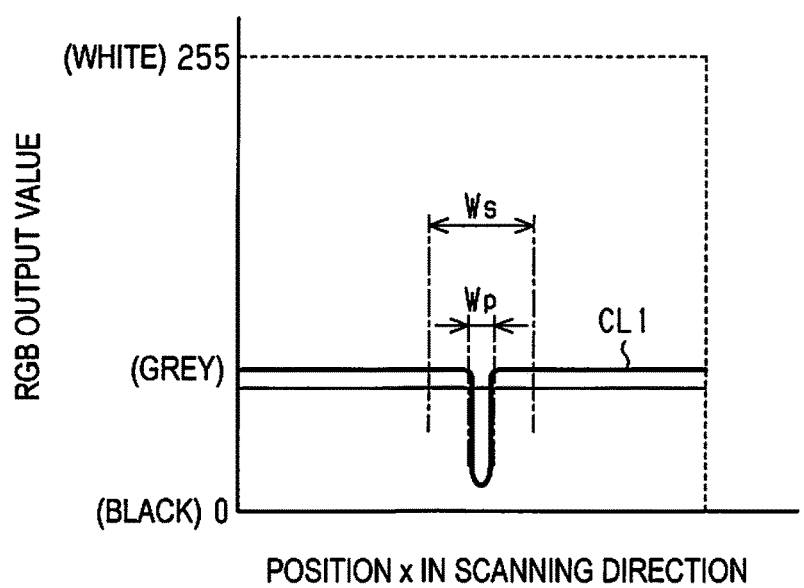
FIG. 10 is a graph describing a process detecting the fault in the carrier sheet.

There is concern of misdetection of other faults as the fault based only on the results of the binarization process. Therefore, based on the range surrounding the fault candidate K1 surrounded by the double dotted line circle in FIG. 9, the output value characteristics line CL1 which illustrates the relationship between the position x in the main scanning direction and the RGB output value is investigated as illustrated in FIG. 10, and if the width Wp of the peak of the fault candidate K1 is a pre-set width threshold Ws or less, peak width determination which determines that the fault candidate K1 is a fault K is performed. Meanwhile, in a case of the width Wp of the peak of the fault candidate K1 exceeding the width threshold Ws, the fault candidate K1 is not made a fault. The peak determination is also performed on the position y in the sub-scanning direction, and if either one of the position x in the main scanning direction and the position y in the sub-scanning direction is determined to be a fault, it is preferable that the fault candidate be made the fault K. This is because this type of linear abrasion is detected as a fault since there are many cases where the abrasion possible when passing through the transport path 32 extends in a line shape in the main scanning direction X or the sub-scanning direction Y.

Figure 11:
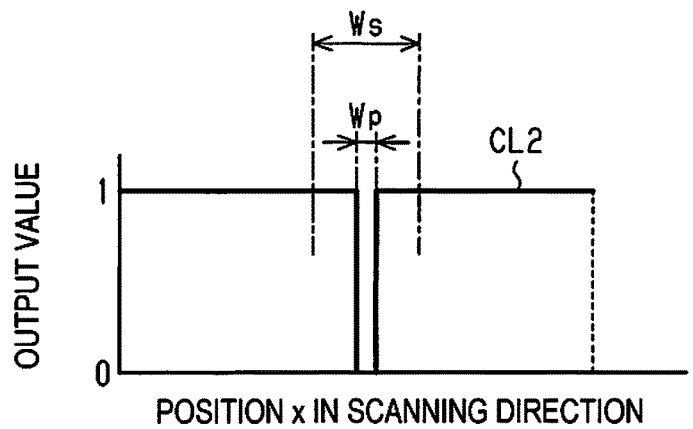
FIG. 11 is a graph describing a process detecting the fault in the carrier sheet.

As illustrated in FIG. 11, the width Wp of the fault candidate K1 on the output value characteristics line CL2 which illustrates the relationship between the position x in the main scanning direction and the output value (0 or 1) is measured based on the binarized data after the binarization process. If the width Wp is the width threshold Ws or less, the fault candidate K1 is made the fault K, whereas, when the width Wp exceeds the width threshold Ws, the peak width determination in which fault candidate is not made the fault may be employed. In this case, it is also preferable to perform the fault width determination from a plurality of directions which include the main scanning direction and the sub-scanning direction, thereby determining whether or not there is a fault. In a case where the area of one fault reaches a threshold area or more, it is determined that the possibility of transfer contamination due to the transfer of printing from the previous original document to the carrier sheet CS is high.

When the fault K is detected based on the results of the binarization processes or the results of the binarization process and the peak width determination, the fault occupancy ratio which is the total area of the faults K which are scattered in the reading object region SA of the carrier sheet CS occupied with respect to the total area of the reading object region SA of the carrier sheet CS. The second deterioration determining unit 86 calculates the deterioration degree of the carrier sheet CS in response to the fault occupancy ratio. That is, the deterioration degree of the carrier sheet CS is determined to be higher as the total area of the faults K increases at the same size of carrier sheet CS. The second deterioration determining unit 86 determines that the carrier sheet CS reaches the replacement period (lifetime) when the fault occupancy ratio reaches A % or more. In a case where not even one fault is present overall, or a case where even though fine faults are present, the faults are evenly distributed overall, it is found that there is uniformity. Although the uniformity is recognized also in a case where clouding due to abrasions or characteristic changes and discoloring such as yellowing is even overall, the determination results of each of (1) transmissivity, (2) uniformity, and (3) discoloring are comprehensively viewed, and the deterioration degree and lifetime of the carrier sheet CS are determined. In addition scratching or folding, in a case where an original document directly after printing or an old original document is pinched by the carrier sheet CS, it is also possible to detect the type of transfer contamination with the determination of uniformity since the transfer contamination occurs due to the transfer of printing from the original document to the carrier sheet CS.

Figure 12:
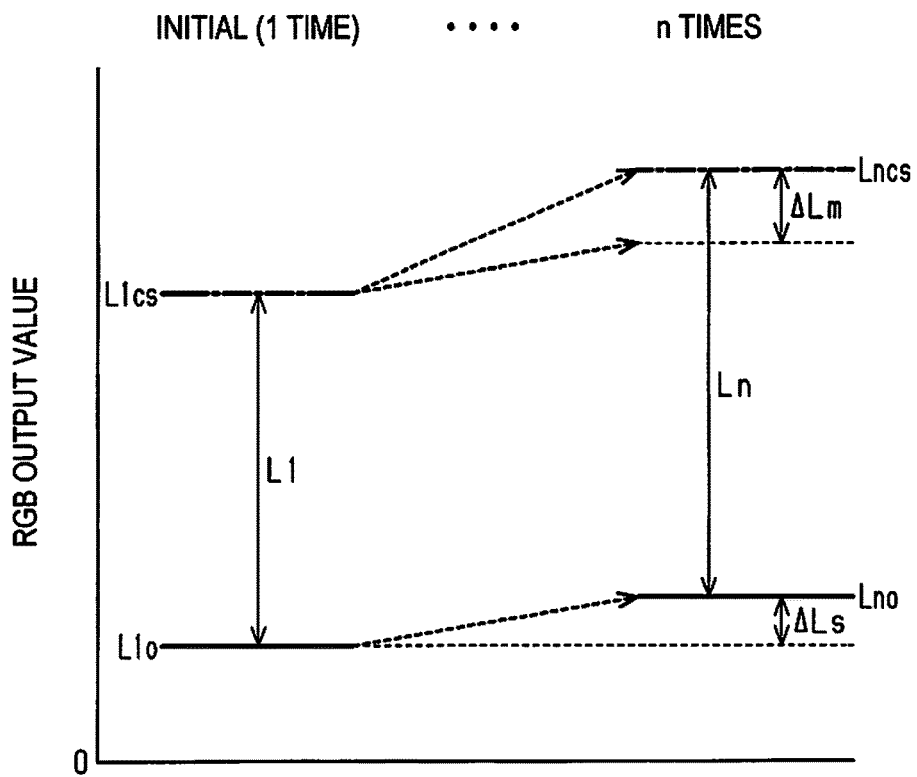
FIG. 12 is a graph describing a discoloring detection process.

The discoloration detector 93 detects discoloring such as yellowing of the carrier sheet CS. The discoloration detection is performed by comparing the first read data when the color reference plate 43 is directly read without the carrier sheet CS and the second read data when the color reference plate 43 is read through the carrier sheet CS. Specifically, as illustrated in FIG. 12, the image sensor 42 reads the color of the color reference plate 43 via the carrier sheet CS in an empty state not pinching the original document at the usage start initiation (first time), and the first color data L1 (also referred to as the "first color value L1") of the carrier sheet CS based on the read data (first read data) is stored in the storage unit 61. The first color data L1 is post-calibration data (L1=L1cs−L1o) represented by the difference between the initial (first time) pre-calibration data L1cs and the initial reference color data L1o based on the read data in which the image sensor 42 directly reads the color of the color reference plate 43 without the carrier sheet CS interposed. Reference color data measured for calibration use when the image reading apparatus 11 is powered on is used for the reference color data L1o. When the user performs the operation in which the initial data is measured with the pre-deterioration carrier sheet CS as a reference using the operation unit 20 or the input unit 101, the carrier sheet CS which is set on the document support 13 by the user, and the reading object region SA is read by the reading unit 40 during transport. The CS initial value CI (refer to FIG. 8A) which includes the first color data L1 acquired by reading of the carrier sheet CS and the reference color data L1o acquired without the carrier sheet CS is stored in the storage unit 61.

Thereafter, the carrier sheet CS is repeatedly used, and the carrier sheet CS gradually deteriorates due to scratches, transfer contamination, folding, clouding, discoloring and the like according to the increase in the number of transports counted by the transport number counter 83. As illustrated in FIG. 12, when the number of transports is n times, the reference color data Lno based on the read data in which the image sensor 42 reads the color of the color reference plate 43 without the carrier sheet CS and the second color data Ln (also referred to as "second color value Ln") based on the read data in which the image sensor 42 reads the color of the color reference plate 43 via the carrier sheet CS. The second color data Ln (Ln=Lncs−Lno) is a value in which the pre-calibration color data Lncs is calibrated using the reference color data Lno.

Discoloration of the carrier sheet CS between the initial (first time) to the n—the time is provided by the color difference ΔLm between the first color data L1 (first color value L1) in the carrier sheet CS and the second color data Ln (second color value Ln) in the current (n-th time) carrier sheet CS. Therefore, the discoloration detector 93 calculates the color difference ΔLm (=Ln−L1) and detects discoloring using the color difference ΔLm. During the calculation thereof, the color difference ΔLs (=Lno−L1o) illustrated in FIG. 12 due to deterioration over time of the light source 41 and the image sensor 42 is canceled out. The second deterioration determining unit 86 detects the deterioration degree of the carrier sheet CS for which the discoloring is a factor in response to the color difference ΔLm. In a case where only yellowing is made a determination parameter, when the color difference ΔLm is a discoloration determination threshold ΔLo or more, the second deterioration determining unit 86 determines that the carrier sheet CS reaches the replacement period (lifetime).

Figure 13:
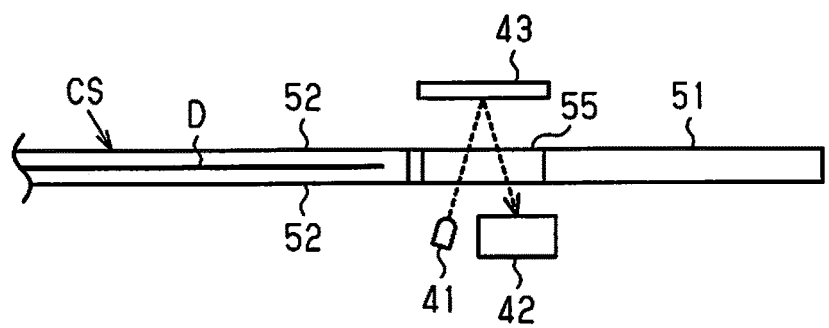
FIG. 13 is a schematic side view describing deterioration determination due to discoloring of the carrier sheet.

In the embodiment, the carrier sheet deterioration determination is also performed using the transparent window section 55 as illustrated in FIG. 13 during normal document reading other than in the carrier sheet deterioration determination ON mode. That is, in the process where the carrier sheet CS with the original document pinched is transported, the light radiated from the light source 41 hits the color reference plate 43 passing through the transparent window section 55 provided between the joining section 51 of the carrier sheet CS and the reading object region SA and is reflected, and the image sensor 42 receives the reflected light passing again through the transparent window section 55. At this time, the read data in which the region which includes the reading object region SA of the carrier sheet CS and the transparent window section 55 is the reading object is acquired. The second deterioration determining unit 86 detects the deterioration degree of the carrier sheet CS based on at least one of the transmissivity, fault and discoloring detected by at least one of the transmissivity acquisition unit 91, the fault detector 92, and the discoloration detector 93 based on the window section data corresponding to the transparent window section 55 from the read data at this time.

In the carrier sheet deterioration determination ON mode, it is necessary that the user intentionally operating the operation unit 20 of the image reading apparatus 11 or the input unit 101 of the host device 100, and there are cases where the deterioration determination is not performed at a suitable frequency depending on the user. Therefore, in the embodiment, the data of the transparent portion except for the original document D from the read data when the original document D is read pinched by the carrier sheet CS, detection of at least one from the transmissivity detection and the fault detection is performed, and the deterioration degree of the carrier sheet CS is detected based on the detection results. In the embodiment, even during ordinary document reading the transparent window section 55 of the carrier sheet CS is used, and the deterioration degree of the carrier sheet CS is detected. In particular, in the embodiment, all of the transmissivity detection, fault detection, and the discoloration detection are performed, and the deterioration degree is detected based on each determination parameter of transmissivity, the presence or absence and total area of faults, uniformity and discoloring obtained from the detection results. For the transparent window section 55, a widow section with a predetermined shape may be provided at the joining section 51 as long as formed by two sheet section 52.

The image of the original document is corrected in response to the deterioration degree of the carrier sheet CS image correction unit 87 detected by the first deterioration determining unit 85, and the second deterioration determining unit 86. The image correction unit 87 performs the image correction process which corrects the image of the original document in response to the deterioration degree when the deterioration degree detected is a correction threshold or more. In the embodiment, the gamma correction process and the fault removal process are performed as image correction processes.

Figure 14:
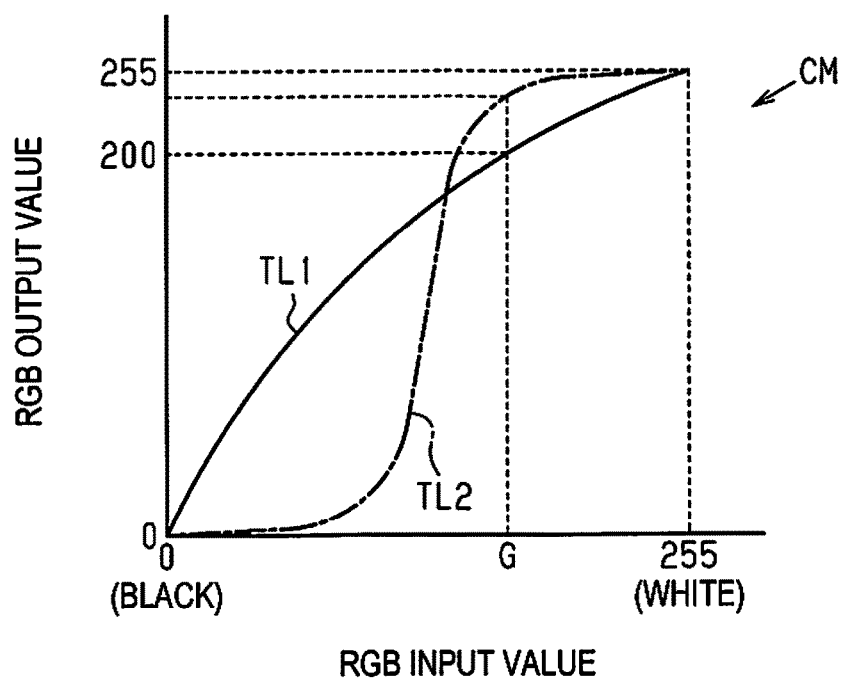
FIG. 14 is a schematic diagram illustrating an image correction map.

First, the image correction process will be described with reference to FIG. 14. FIG. 14 illustrates a correction map CM (correction map data) used in the image correction process. The correction map CM is stored in the storage unit 61. The correction map CM illustrated in FIG. 14 is used in the gamma correction process which corrects the RGB value of the image. In the correction map CM illustrated in FIG. 14, the horizontal axis is the pre-correction RGB input value (for example, 256 gradations) and the vertical axis is the post-correction RGB output value (for example, 256 gradations). In the example in FIG. 14, the brightness is lowered as the RGB value decreases.

The correction curve TL1 illustrated by the solid line in the correction map CM illustrated in FIG. 14 is used in correction of the image during ordinary reading in which the original document D is directly read. The correction curve TL1 draws a gentle arc in which the RGB output value become slightly larger than the RGB input value. Meanwhile, in a case where the deterioration degree of the carrier sheet CS is at a correction threshold or more, the gamma correction process in which an S-shaped correction curve TL2 during carrier sheet reading indicated by the single dotted line in FIG. 14 is performed. In the correction curve TL2, compared to the correction curve TL1 during normal reading, the incline illustrated by the ratio of the RGB output value to the RGB input value becomes relatively large in the intermediate gradation region, and becomes relatively low in the low gradation region and the high gradation region. In this way, the correction curve TL2 has an increased contrast region in which the incline becomes relatively high in the intermediate gradation region. In the increased contrast region, the RGB output value is output in a wider range to the range of the RGB input value and the image is corrected to have a higher contrast.

For example, for the fault K (refer to FIG. 9) of the RGB input value "G" in FIG. 14, although the RGB output value becomes "200" in the ordinary gamma correction process using the correction curve TL1, the RGB output value becomes "240" in the gamma correction using the correction curve TL2, and the fault K is corrected to be thinner than in the ordinary gamma correction. In the intermediate gradation region which includes the fault, when the RGB value of each pixel is corrected according to the correction curve TL2, for example, in a case of a monochrome image, a dark gray fault is corrected to be black or a light gray fault is corrected to be white, and the fault K is removed or becomes difficult to see.

A plurality of correction curves TL2 illustrated in FIG. 14 with differing inclinations in a predetermined intermediate gradation region, and one may be selected in response to the deterioration degree of the carrier sheet CS. A correction curve TL2 having an inclination in response to the deterioration degree of the carrier sheet CS may be created on a case-by-case basis. The increased contrast region is not limited to the intermediate gradation region, and an appropriate gradation region in which the faults or discoloration are able to be reduced may be selected. For example, histogram analysis of the carrier sheet image is performed, a small peak in which a fault which is separated from the main distribution (for example, the gray RGB input value range of the gray reference plate) is detected, and the increased contrast region in which the inclination of the correction curve TL2 increases may be set to the range with includes the RGB input value of the small peak. The gamma correction process may be carried out on all regions of the image of the original document, or may be carried out on a partial small region which includes the fault.

The image correction unit 87 performs the fault removal process. The fault removal process stores the position of the detected fault and the coordinates of the region, and performs a process of reducing or removing the fault. The fault removal process performs a process of removing the fault by carrying out a smoothing process which smoothes a plurality of pixel values, and by performing interpolation while interpolation calculating the pixel valued of the fault portion with a plurality of pixel values at the periphery of the fault. The image correction unit 87 further performs the image correction process which corrects the yellow to white in response to the present hue and corrects reddening to white in a case where the (1) uniformity and the (2) transmissivity are in the normal range and only the (3) discoloration (color difference ΔL) is at the threshold or more.

The transport controller 71 controls the transport speed in response to the deterioration degree of the carrier sheet CS. The transport controller 71 causes the transport speed to differ in a case where the carrier sheet CS has the first deterioration degree and in a case where the carrier sheet CS has the second deterioration degree which is a higher deterioration degree than the first deterioration degree. For example, the transport controller 71 performs correction which increases the transport speed as the deterioration degree increases. In this case, the transport controller 71 controls the transport speed to be a higher speed than the transport speed when the carrier sheet CS has the first deterioration degree in a case where the carrier sheet CS has the second deterioration degree which is a higher deterioration degree than the first deterioration degree. Conversely thereto, the transport speed may be controlled to a lower speed than the transport speed when the carrier sheet CS has the first deterioration degree in a case where the carrier sheet CS has the second deterioration degree which is a higher deterioration degree than the first deterioration degree.

Whereas a low friction processing which reduces the coefficient of friction of the roller pairs 33 to 36 of the transport system is carried out on the outer surface of the sheet portion 52 of the carrier sheet CS, such a process need not be carried out on the inner surface which comes in contact with the original document D of the sheet portion 52. An emboss processing (fine roughness processing) is included as an example of the low friction processing. In a case where the frictional resistance is increased by rubbing the low friction processed surface (for example, the emboss processing) as the deterioration of the carrier sheet CS progresses, the transport motor 37 is driven at a lower speed, thereby slowing the transport speed of the rollers as the deterioration degree increases even if the set transport speed is the same. That is, as the deterioration degree increases, the transport speed is reduced when the carrier sheet CS is transported by the transport unit 31. Meanwhile, in a case where the frictional resistance of the outer surface of the sheet portion 52 is reduced, and slight slipping thereby occurs between the carrier sheet CS and the roller pairs 33 to 36 as the deterioration of the carrier sheet CS progresses, it is preferable that the transport motor 37 be driven at a higher speed, thereby increasing the transport speed of the rollers as the deterioration degree increase even if the set transport speed is the same. That is, as the deterioration degree increases, the transport speed is increased when the carrier sheet CS is transported by the transport unit 31.

The notification processor 88 illustrated in FIG. 8A notifies the user that the carrier sheet CS is at the replacement period by lighting the notification unit 27 or displaying a message on the display unit 102 of the host device 100 when the deterioration degree of the carrier sheet CS reaches the threshold or more based on the carrier sheet deterioration determination results. The notification processor 88 notifies the user by displaying the deterioration degree of the carrier sheet CS on the display unit of the host device even if the carrier sheet CS is not at the replacement period during the carrier sheet deterioration determination mode. When the carrier sheet CS is at the replacement period or when the deterioration degree is high, the notification processor 88 further detects the cause thereof, and displays a message prompting the removal of the cause of the deterioration. For example, in a case where the area of one fault reaches a threshold or more, since the potential of transfer contamination due to the transfer of printing from the previous original document to the carrier sheet CS is high, the user may be notified of the potential of transfer contamination by means of a message on the display unit 102 of the host device 100. In this case, the position of the transfer contamination may be visually notified along with an image of the carrier sheet on the display unit 102 of the host device 100 and a message may be displayed which promotes the removal thereof.

Next, the actions of the image reading apparatus 11 will be described.

The user sets the original document D on the document support 13 when the original document D is read by the image reading apparatus 11. When an image of the original document D such as a booklet document, such as a passport, or a folded document is read, the original document D is set on the document support 13 pinched by the carrier sheet CS, and the operation unit 20 or the input unit 101 of the host device 100 is operated, thereby causing the image reading apparatus 11 to start scanning. In the following description, a case of reading the original document D using the carrier sheet CS will be described as an example.

The user operates the input unit 101 of the host device 100, thereby providing instructions to the reading driver 105 or operates a predetermined switch from the operation unit 20 of the image reading apparatus 11, and turns the carrier sheet deterioration determination mode ON when the deterioration degree of the carrier sheet CS is verified or when it is verified whether the designated count corresponding to the lifetime is reached. The designated count corresponding to the lifetime is a predetermined count within a range of 500 to 3000. When the carrier sheet deterioration determination mode is turned ON, the carrier sheet CS is set on the document support 13 without an original document pinched, the operation unit 20 or input unit 101 is operated and the instruction to start scanning is provided.

When the image reading apparatus 11 is driven, the carrier sheet CS with the original document D pinched is fed, and the registration information is read from the section to be read 53 provided on the joining section 51 of the carrier sheet CS partway through transport. The identification information acquisition unit 82 deciphers the code information read from the two-dimensional code 54, thereby acquiring at least the identification information for each individual carrier sheet CS. The NFC reader 57 reads the registration information from the NFC tag 56 provided at the joining section 51 of the carrier sheet CS.

Below, the various processes will be described according to the flowchart.

The computer 60 in the image reading apparatus 11 executed the program illustrated by the flowchart in FIG. 16 when the command for starting scanning by which the reading of the original document or the carrier sheet CS is started. Below, the document reading process executed by the computer 60 will be described with reference to FIG. 16.

First, in step S11, it is determined whether or not the carrier sheet deterioration determination mode is ON. If the deterioration determination mode is ON, the process proceeds to step S12, and proceeds to step S13 if OFF.

In step S12, the carrier sheet deterioration degree determination process is performed. The carrier sheet deterioration degree determination process is executed based on the routine illustrated in FIG. 16. Details of the determination process are described later. When the carrier sheet deterioration degree determination process is ended, the routine finishes.

In step S13, the original document is transported. The transport controller 71 causes the transport motor 37 to be driven, and transports the original document D at a predetermined transport speed. In this case, the carrier sheet CS is transported with the joining section 51 as the leading end in a case where the original document D is pinched by the carrier sheet CS.

In step S14, it is determined whether the carrier sheet is detected. The computer 60 monitors the detection signals of the CS sensor 45 and detects the carrier sheet CS with the switch over, when the detection signal switches from a non-transmissive state in which light is blocked by the joining section 51 to a light transmissive state in which light is not blocked by the joining section 51. Meanwhile, in a case of only the original document D, the carrier sheet is not detected when the detection signal continues longer than the transport of the width portion of the joining section 51 in the non-transmissive state in which light is blocked by the original document D. If the carrier sheet CS is detected, the process proceeds to step S15, and proceeds to step S25, if the carrier sheet is not detected.

In step S15, the identification information is acquired. That is, in a case of the carrier sheet CS (positive determination in S14), the section to be read 53 provided on the joining section 51 of the carrier sheet CS is read, thereby acquiring the registration information which includes at least the identification information. At this time, in a case where the section to be read 53 is a two-dimensional code 54, the registration information which includes at least the identification information by the identification information acquisition unit 82 decrypting the two-dimensional code read by the reading unit 40. In a case where the section to be read 53 is an NFC tag 56, the identification information acquisition unit 82 acquires the registration information which includes at least the identification information read by the NFC reader 57. There are cases of the registration information including the task conditions associated with the identification information and cases of not including the conditions. In a case of not including the task conditions, the task conditions associated with the identification information are stored in the storage unit 61.

In step S16, the calculation process of the number of transports N of the carrier sheet is performed. That is, the processor 73 performs the counting process of the number of transports of the carrier sheet CS as a process associated with the identification information. Specifically, the processor 73 acquires the count value data associated with the identification information from the storage unit 61 and sets the transport number counter 83, and adds one to the count value of the transport number counter 83 and updates the accumulated value of the number of transports. As a result, the accumulated number of transports from the usage start of the carrier sheet CS specified by the identification information is counted as a count value by the transport number counter 83.

Next, in step S17, the scanning operation is performed with the reading conditions from the task conditions associated with the identification information. That is, the reading controller 72 reads the original document D with the reading conditions (such as resolution, reading color).

In step S18, the read data is acquired. The read data includes an image of the reading object region SA and the region (transparent window region) of the transparent window section 55 illustrated in FIG. 9.

In step S19, the discoloration detection process of the carrier sheet is performed based on the read data of the transparent window region. The discoloration detector 93 cuts out the transparent window region corresponding to the transparent window section 55 from the read data, and performs discoloration detection process (refer to FIG. 12) on the transparent window region. In the discoloration detection process, the color difference $\Delta Lm$ (=Ln−L1) indicated by the difference between the first color value L1 and the second color value Ln is acquired as the discoloration information.

In step S20, the image correction process is performed based on the deterioration degree of the carrier sheet associated with the identification information and the currently detected discoloration information. The deterioration degree information acquired by the previous carrier sheet deterioration degree determination process performed with the instruction of the user is stored in the storage unit 61 in a state where associated with the identification information. The image correction unit 87 reads out the deterioration degree information DL associated with the identification information from the storage unit 61, and performs the image correction process based on the deterioration degree information DL read out and the discoloration information acquired by the discoloration detection process in which the transparent window region in step S19 is made the object. The carrier sheet gamma correction process and the fault removal process are performed as image correction processes. The carrier sheet gamma correction process is performed using the correction curve TL2 illustrated in FIG. 14. The fault removal process reduces or removes faults by interpolating the pixels of the fault with the pixels at the periphery of the fault. As a result of these processes, the image data after the image correction process is acquired.

Here, use of the deterioration degree information acquired by the previous carrier sheet deterioration degree determination process and the currently detected discoloration information is because, although the deterioration degree information has the potential of being old information, the information which is only obtained from the all region of the reading object region SA such as the presence or absence of the fault, the position or uniformity uses the deterioration degree information. The information also ascertained from local regions of the sheet portion 52, such as discoloring or clouding comprehensively determines the discoloration information from the deterioration degree information and the current discoloration information. If the extent of discoloring for current discoloration information proceeds further than that of the discoloration information from the deterioration degree information, the image correction process is performed based on the current discoloration information.

In step S21, the read data is saved with the save conditions from the task conditions associated with the identification information. The computer 60 converts read data to a designated save format (such as JPEG, PDF, and GIF), and saves the read data to a designated save destination, for example, a designated folder in the storage unit 104 on the host device 100. For example, the PDF format is designated as the save format in the task conditions associated with the identification information, and folder A in the storage unit 104 of the host device 100 is designated as the save destination. In this case, after the read data after image correction by the image correction unit 87 is converted to the PDF format, the processor 73 saves the PDF format read data to the host device 100 with the folder A designated as the save destination. As a result, the read data is saved on the host device 100 to the designated save destination in the designated save format.

In step S22, it is determined whether or not the conditions such as the transport number N being a number threshold N1 or more (N≥N1) is satisfied. That is, if N≥N1 is not satisfied, the process proceeds to step S23, and if N≥N1 is satisfied, the process proceeds to step S24.

In step S23, notification that the carrier sheet reaches the replacement period is performed. Specifically, when N≥N1 is established (positive determination in S22), the notification processor 88 performs notification of the replacement period by causing a predetermined notification unit 27 to light or blink, and transmits a replacement period notification request to the reading driver 105 of the host device 100, and causes the reading driver 105 to display a message of the replacement period on the display unit 102. During the document reading, no notification is performed in a case where N z N1 is not achieved.

Meanwhile, in a case where the carrier sheet CS is not detected in step S14, that is a case where the original document D is transported, in step S24, the original document is scanned with the set reading conditions. In step S25, the read data of the original document is output to the host device 100. At this time, the read data is stored in a designated save format and save destination by the user operating the input unit 101 before the start of the reading instruction.

Next, the details of the carrier sheet deterioration degree determination process will be described with reference to FIG. 16.

In step S31, the scan operation is performed while the carrier sheet not pinching the original document is transported.

In step S32, the identification information is acquired. That is, the section to be read 53 provided on the joining section 51 of the carrier sheet CS is read, and the identification information acquisition unit 82 acquires the registration information which includes the identification information based on the data read. The process is basically similar to step S15 in FIG. 15.

In step S33, the counting process of the number of transports N of the carrier sheet is performed. The process is basically similar to step S16 in FIG. 15, and the processor 73 performs the counting process of the number of transports by means of the transport number counter 83 as the process associated with the identification information.

In step S34, the transmissivity of the carrier sheet is measured. That is, the transmissivity acquisition unit 91 acquires the light transmissivity of all regions or a partial region of the transparent sheet portion 52 of the carrier sheet CS based on the data read by the image sensor 42 of the CS sensor 45.

In step S35, the fault detection process of the carrier sheet is performed based on the read data. That is, the fault detector 92 first subjects the image data of the reading object region SA (refer to FIG. 9) of the carrier sheet CS to the binarization process at the fault detection threshold, and detects the fault based on the value after binarization. It is preferable that the fault detector 92 make the fault into the fault candidate K1, and perform the peak width determination which narrows down the fault K from the fault candidate K1. In this case, the fault detector 92 investigates the output value characteristic line CL1 which indicates the relationship between the position x in the main scanning direction and the RGB output value in the peak width determination illustrated in FIG. 10, based on the image data of the reading object region SA, and makes the fault candidate K1 the fault K, as long as the width Wp of the peak of the fault candidate K1 is the width threshold Ws set in advance or less. Alternatively, the fault detector 92 makes the fault candidate K1 the fault K as long as the width Wp of the fault candidate K1 on the output value characteristic line CL2 which indicates the relationship between the position x in the main scanning direction and the output value (0 or 1) is the width threshold Ws or less based on the binarization data after binarization processing in the peak width determination illustrated in FIG. 11.

In step S36, the discoloration detection process of the carrier sheet is performed based on the read data. That is, the discoloration detector 93 obtains the color difference ΔLm (=Ln−L1) between the initial color data L1 (first color L1) of the carrier sheet CS and the color data (second color Ln) of the current (n-th) carrier sheet CS, and detects the color difference ΔLm as the discoloration.

In step S37, the deterioration degree of the carrier sheet is acquired based on the transmissivity measurement value, the fault detection results, and the discoloration detection results. That is, the second deterioration determining unit 86 comprehensively determines the deterioration degree based on a plurality of parameters such as (1) transmissivity, (2) uniformity, (2) number and total area of faults, and (3) color difference (color difference ΔLm) obtained from the transmissivity measurement value, the fault detection results, and the discoloration detection results.

In step S38, it is determined whether the carrier sheet is at the lifetime. When the deterioration degree of the carrier sheet CS reaches the threshold or more, it is determined that the carrier sheet CS is at the lifetime. If the carrier sheet is not at the lifetime, the process proceeds to step S39, and if at the lifetime, the process proceeds to step S40.

In step S39, notification that the carrier sheet is capable of continued use is performed. That is, the notification processor 88 performs notification that the carrier sheet CS is capable of continued use by lighting, blinking or changing the lighting color of the notification unit 27 and performs notification that the carrier sheet CS is capable of continued use with a message on the display unit 102.

In step S40, notification that the carrier sheet reaches the replacement period is performed. That is, the notification processor 88 performs notification that carrier sheet CS reaches the replacement period by lighting, blinking or color of the notification unit 27 in a different light state to when capable of continued use, and displays a message that the carrier sheet CS reaches the replacement period and a message prompting the replacement of the carrier sheet CS on the display unit 102.

According to the above-described first embodiment, it is possible for the effects indicated below to be obtained.

(1) The section to be read 53 in which the identification information able to individually identify the carrier sheet CS is recorded is provided on the joining section 51. The image reading apparatus 11 is provided with an identification information reading unit which acquires the identification information by reading from the section to be read 53 (such as the reading unit 40, NFC reader 57, and the identification information acquisition unit 82 which form an example thereof) and processor 73 which performs a process associated with the identification information read from the section to be read 53. Thus, it is possible to perform favorable processing matched to the individual carrier sheet CS. For example, the deterioration degree of the carrier sheet CS is detected based on the count value in which the number of transports N of the carrier sheet CS is counted, and it is possible to notify the user that the carrier sheet CS is at the replacement period in a case where the deterioration degree reaches a threshold or more (N≥N1 is satisfied).

(2) In the image reading apparatus 11, the processor 73 counts the accumulated number of transports N in which the carrier sheet CS is transported through the transport path 32 of the transport unit 31 by means of the transport number counter 83 for each item of identification information as the process associated with the identification information. Thus, it is possible for the number of transports of the carrier sheet CS to be individually managed.

(3) A notification unit 27 which performs notification that the carrier sheet CS is deteriorated when the number of transports N of the carrier sheet CS is a threshold number N1 or more. Thus, the user easily avoids unknowingly continuing to use the carrier sheet for a carrier sheet for which the number of transports reaches the threshold number.

(4) A transport number counter 83 and a first deterioration determining unit 85 are provided as an example of a detector which detects the deterioration degree of the carrier sheet CS based on the number of transports of the carrier sheet CS. The processor 73 performs processing in response to the deterioration degree detected. Thus, by the process being performed in response to the deterioration degree of the carrier sheet CS, only a similar process to when the deterioration degree is low is performed regardless of whether the deterioration degree of the carrier sheet CS is comparatively high, and it becomes easy to avoid the influence of deterioration appearing in the read data when the deterioration degree increases.

(5) The processor 73 causes the reading unit 40 to read the original document D pinched by the carrier sheet CS with the task conditions associated with the identification information as the process associated with the identification information. Thus, the user can cause the original document D to be read in suitable task conditions matching the individual carrier sheet CS.

(6) The task conditions include at least one condition from reading conditions, image processing conditions, and read data save conditions. Thus, it is possible to perform reading of the original document D (such as resolution and reading color), image processing (such as the image correction process and folded document synthesis processing), and saving (such as save format, save destination) with at least one of the reading conditions, image processing conditions and read data save conditions associated with the identification information when the user causes the image reading apparatus 11 to read the original document D pinched by the carrier sheet CS. In particular, in the embodiment, since the task conditions include all of the conditions of the reading conditions, image processing conditions, and the read data save conditions, if the carrier sheet CS is used, it is possible to perform reading of the original document D, image processing, and saving of the read data with the conditions associated with the identification information read from the section to be read 53.

(7) The reading unit 40 is provided as an example of a light receiving unit which receives transmitted light in which light of the light source 41 passes through the transparent portion (reading object region SA or transparent window section 55) of the carrier sheet CS, and the processor 73 includes a second deterioration determining unit 86 as an example of a detector which detects the deterioration degree of the carrier sheet CS based on the light reception data obtained by the reading unit 40 receiving light. Thus, it is possible for the actual deterioration degree in response to the individual method of use for each carrier sheet CS to be better acquired than a case of detecting the deterioration degree based on the number of transports of the carrier sheet CS. For example, the user can easily avoid continuing to use a carrier sheet CS in which the lifetime is reached lowering the light transmissivity and can carry out the image correction process in response to the deterioration degree on the image of the original document.

(8) When the deterioration degree detected (determined) by the first deterioration determining unit 85 or the second deterioration determining unit which form an example of the detector reaches a threshold or more, a notification unit 27 which performs notification that the carrier sheet CS is deteriorated is provided. Thus, the user easily avoids continuing to use the carrier sheet CS without knowing the carrier sheet CS is deteriorated.

(9) When the color difference between the initial color value obtained by the reading unit 40 as an example of the light receiving unit reading the color of the transparent portion of the initial carrier sheet CS and the current color value obtained by reading the color of the transparent portion of the current carrier sheet CS reaches a threshold or more, the deterioration degree of the carrier sheet CS reaches a threshold or more. Thus, the user easily avoids unknowingly continuing to use the carrier sheet CS for a carrier sheet CS which is discolored enough for the deterioration degree to reach the threshold or more.

(10) The first color value L1 corresponding to the color difference between both images is acquired based on the image in which the color reference plate 43 is read without the carrier sheet interposed and the image in which the color reference plate 43 is read via the initial carrier sheet CS. The second color value Ln corresponding to the color difference between both images is acquired based on the image in which the color reference plate 43 is read without the current carrier sheet which is a detection object interposed and the image in which the color reference plate 43 is read via the current carrier sheet CS. The second deterioration determining unit 86 which forms an example of the detector detects (determines) the deterioration degree of the carrier sheet CS based on the first color value L1 and the second color value Ln. Thus, it is possible for the deterioration degree pertaining to the discoloring such as yellowing of the carrier sheet CS to be detected individually with a comparatively high precision in which the influence of the deterioration over time of the reading unit 40 is canceled out.

(11) The example of the light receiving unit is the reading unit 40 (more specifically, the image sensor 42) able to read the original document, and the second deterioration determining unit 86 which is an example of the detector detects the deterioration degree of the carrier sheet CS based on the light reception data (read data) obtained by receiving transmitted light passing through the reading object region SA as a transparent portion of the carrier sheet CS not pinching the original document. Thus, it is possible for the deterioration degree of the carrier sheet to be more reliably detected based on light reception data in which transmitted light which passes through a wide reading object region SA of the carrier sheet CS is received without being hidden by the original document. For example, although the light reception data is acquired at the transparent portion avoiding the original document from the reading object region SA in a carrier sheet in which the original document is pinched, since the original document is not pinched, it is possible to acquire the light reception data with the region in which the original document is normally pinched as the transparent portion, and it is possible for the deterioration degree to be more reliably detected. It is possible to better notify the user of a suitable replacement period.

(12) The second deterioration determining unit 86 which configures an example of the detector detects the transmissivity, uniformity, and discoloration for the transparent portion of the carrier sheet CS based on the light reception data and detects the deterioration degree based on a plurality of determination parameters included these three. Thus, it is possible to more suitably notify the user of at least the replacement period from the deterioration degree of the carrier sheet CS and the replacement period.

(13) The process performed by the processor 73 is an image correction process which corrects the image of the original document D read by the reading unit 40 in response to the deterioration degree of the carrier sheet CS. Thus, even if the carrier sheet CS is deteriorated, it is possible to acquire a suitable image of the original document D in which influence such as scratches, clouding, and discoloration due to the deterioration is reduced or eliminated.

(14) The image correction process includes at least one of the gamma correction process and fault removal process. Thus, when the gamma correction process is performed, it is possible to acquire an image of the original document with little influence of the deterioration of the carrier sheet CS by means of different to when the carrier sheet is not deteriorated. When the fault remove processing is performed, even if the carrier sheet CS is deteriorated and there are faults, it is possible to acquire an image of the original document with little influence from the fault. In particular, in the embodiment, since both the gamma correction process and the fault removal process are performed, it is possible to acquire read data in which the influence of the discoloring or the clouding is reduced by the gamma correction process, and the influence of faults such as scratching is reduced by the fault removal process.

(15) A transport controller 71 which controls the transport speed when the original document is transported by the transport unit 31 in response to the number of transports of the carrier sheet is provided. Thus, even if the surface of the carrier sheet CS is rubbed due to contact with the transport unit 31 and slipping arises due to changes in the frictional resistance between the carrier sheet CS and the transport unit 31, it is possible for the carrier sheet CS to be transported at a desired transport speed by the transport unit 31.

(16) The transport controller 71 performs correction which increases the transport speed as the number of transports N increases. For example, even if the carrier sheet CS slips with respect to the roller pairs 33 to 36 of the transport unit 31 according to the rubbing of the outer surface thereof, the transport speed is not proportionally slowed. Thus, it is possible for the original document D to be read with a comparatively high image quality while transporting the carrier sheet CS at suitable transport speed proportionate to the slipping due to the friction of the carrier sheet CS generated.

(17) The image reading system which includes the image reading apparatus 11 or the image reading apparatus 11 and the reading driver 105 is provided with a task setting unit 111 as an example of a setting unit which sets the content of the process associated with the identification information based on the input information received. It is possible for the user to set the desired content with respect to the process associated with the identification information performed by the processor 73 by operating the operation unit 20 or the input unit 101, thereby providing the input information to the task setting unit 111.

(18) The print driver 106 which forms an example of the host driver is provided with an identification information print processor 113 (example of a print processor) which generates print data (example of printing information) in which the at least the identification information from the content of the process set by the task setting unit 111 based on the input information and the registration information which includes the identification information is printable on the joining section 51 of the carrier sheet CS. By the printing data being output to the printer 120, it is possible to print at least the identification information from the setting information on the joining section 51 of the carrier sheet CS. It is possible for the user to print the two-dimensional code 54 in which at least the identification information from the registration information which includes the identification information and the task conditions associated with the identification information on the joining section 51 of the carrier sheet CS. In this case, It is possible to print the registration information which includes the identification information and the task conditions associated with the identification information on the joining section 51 of the carrier sheet CS with the two-dimensional code 54. Meanwhile, in a case where the user prints the two-dimensional code 54 in which the registration information which includes the identification information and does not include the task conditions on the joining section 51 of the carrier sheet CS, the task setting unit 111 causes the task conditions associated with the identification information in the printed two-dimensional code to be saved in the storage unit 61. Therefore, if the two-dimensional code 54 of the carrier sheet CS is read, it is possible for the image reading apparatus 11 to acquire the task conditions associated with the identification information from the storage unit 61, and to provide the read data read from the original document D with the desired task conditions set by the user.

(19) The image reading apparatus 11 is provided with an NFC reader 57 as an example of reader unit which is able to read the identification information from the NFC tag 56 as an example of the short range wireless communication tag provided on the joining section 51 of the carrier sheet CS. Thus, it is possible for the processor 73 to perform the process associated with the identification information read by the NFC reader 57 from the NFC tag 56. The image reading apparatus 11 is provided with an NFC writer 58 as an example of a writer unit which is able to write the setting information set by the task setting unit 111 to the NFC tag 56 of the carrier sheet CS. Thus, it is possible to write at least the identification information from the registration information which includes the content of the process desired by the user and the identification information to the NFC tag 56. It is possible to read at least the identification information from the NFC tag 56 provided on the joining section 51 of the carrier sheet CS with the NFC reader 57 of the image reading apparatus 11, and for the process associated with the identification information to be performed by the processor 73.

It should be noted that embodiment may be modified to the forms outlined below.

The light receiving unit is not limited to being formed by the reading unit 40. The deterioration degree of the carrier sheet CS may be detected based on the light reception data in which light passing through the carrier sheet CS is received by the CS sensor 45.

The process of step S19 in FIG. 15 may detect the deterioration degree of the carrier sheet CS based on the light reception data in which transmitted light in which light of the light source 41 passes through a portion other than the original document D from the reading object region SA of the carrier sheet CS, instead of the transparent window region, is received. In this case, it is also possible to detect discoloring and clouding as the deterioration degree of the carrier sheet CS based on the light reception data corresponding to the portion other than the original document D. Since the transparent window section 55 need not be provided, it is possible to detect the deterioration degree of the carrier sheet CS together during the reading operation of the original document D even with a carrier sheet CS which is an existing product. It is possible to provide good quality read data (image data) by performing the necessary image correction processes with respect to the read data in response to the deterioration degree, and reducing or removing the influence of the deterioration degree of the carrier sheet CS from the read data.

The light reception data may be acquired with the transparent window section 55 and the portion other than the original document from the reading object region SA as an object during the reading operation of the original document D, thereby detecting the deterioration degree of the carrier sheet CS. In this case, it is possible to detect the deterioration degree based on the light reception data of the transparent window section 55 even if all regions of the reading object region SA are hidden by the original document D, whereas, if the original document D is smaller than the reading object region SA, it is possible to acquire the light reception data with the transparent portion other than the original document D from the reading object region SA, in addition to the transparent window section 55, as the object, and to detect a more suitable deterioration degree. As a result, it is possible to notify the user of the suitable replacement period of the carrier sheet CS and provide higher quality read data by means of a suitable image correction process.

The process associated with the identification information is not limited to the transport number counting process and the image correction process. Other processes may be performed.

The second deterioration determining unit 86 may have a configuration provided with only one or only two of the transmissivity acquisition unit 91, the fault detector 92, and discoloration detector 93. In this configuration, it is also possible to detect the deterioration degree pertaining to at least one of clouding, faults, or discoloring.

It is sufficient if the image correction process includes at least one of gamma correction process and fault removal process. Only the gamma correction process may be performed or only the fault removal process may be performed. An image correction process other than the gamma correction process or the fault removal process may be performed.

The initial carrier sheet indicates a carrier sheet CS with the time the deterioration degree of the carrier sheet CS is detected as a reference and is not limited to a carrier sheet CS when first used. The user performs an operation measuring an initial reference value, and when the carrier sheet CS is measured is initially set. Therefore, the initial carrier sheet CS is not limited to the first usage start, and can be the second, third or tenth time from usage start. If the initial reference value measured by the user is the 100th time, the carrier sheet CS at the 100th time is made the initial carrier sheet CS.

The task conditions do not necessarily include all of the reading resolution, the reading color, the stitching orientation of the folded document, and the save format and save destination of the read data, and at least one thereof may be included. The task conditions may have a configuration which includes only the reading conditions (such as reading resolution and reading color), a configuration which includes only the image processing conditions (stitching orientation of the folded document), or a configuration which includes only the save conditions (save format and save destination). A configuration which includes two of these three conditions may be used.

The image reading apparatus is not limited to a sheet feeder-type, and may be applied to a flat bed-type image reading apparatus provided with an automatic document feeding function (automatic document feeder) as an example of the transport unit. In the case of such a configuration, since there are cases of using the method of being used of transporting the carrier sheet CS with the original document pinched by means of an automatic feed function, it is possible to obtain the same results as the sheet feeder-type by providing the same configuration as the embodiment.

For example, the total of the number of transports of the carrier sheet CS transported by the plurality of image reading apparatuses may be managed per identification information item with the reading driver 105 in the host device 100 shared by a plurality of image reading apparatuses. According to the configuration, even if the carrier sheet CS is used in common by a plurality of image reading apparatuses, it is possible to comparatively accurately manage the number of transports of the carrier sheet CS. It is possible for the reading of the original document D to be performed by the image reading apparatus with the task conditions in response to the individual carrier sheet CS.

The entire discovery of Japanese Patent Application No.: 2015-190178, filed Sep. 28, 2015 is expressly incorporated by reference herein.

What is claimed is:

1. An image reading apparatus comprising:
an identification information reading unit which acquires identification information by reading the identification information from a section to be read at which identifiable identification information is recorded for each individual carrier sheet and which is provided at a joining section of the carrier sheet in which two transparent sheets for pinching an original document are joined at a portion of a peripheral edge portion;
a processor including a detector which detects a deterioration degree of the carrier sheet based on the number of transports of the carrier sheet, the processor performing a process, which is associated with the identification information read by the identification information reading unit, in response to the deterioration degree; and
a light receiving unit which receives transmitted light in which light from a light source passes through a transparent portion of the carrier sheet, the light receiving unit being a reading unit which reads the original document pinched by the carrier sheets,
the detector detecting the deterioration degree of the carrier sheet based on the light reception data obtained by the light receiving unit receiving light,
the detector detecting the deterioration degree of the carrier sheet based on a color difference between a first color value obtained by the reading unit reading a color of the transparent portion of the initial carrier sheet and a second color value obtained by the reading unit reading a color of the transparent portion of the current carrier sheet.

2. The image reading apparatus according to claim 1,
wherein a color reference section that exhibits a reference color used in color correction of the read data read by the reading unit is provided at a position that is readable by the reading unit, and
the detector detects the deterioration degree of the carrier sheet based on a color difference between the first color value based on the image at which the color reference section is read without the carrier sheet and an image at which the color reference section is read via the initial carrier sheet and the second color value based on an image at which the color reference section is read without the current carrier sheet and an image at which the color reference section is read via the current carrier sheet.

3. The image reading apparatus according to claim 2,
wherein the light receiving unit is a reading unit which reads the original document, and the detector detects the deterioration degree of the carrier sheet based on the light reception data obtained by receiving transmitted light passing through a reading object region with the reading object region of the carrier sheet not pinching the original document as the transparent portion.

4. An image reading apparatus comprising:

an identification information reading unit which acquires identification information by reading the identification information from a section to be read at which identifiable identification information is recorded for each individual carrier sheet and which is provided at a joining section of the carrier sheet in which two transparent sheets for pinching an original document are joined at a portion of a peripheral edge portion;

a transport unit which transports the carrier sheet; and a reading unit which reads an original document pinched by the carrier sheets on a transport path;

a processor which performs a process which is associated with the identification information read by the identification information reading unit, the processor counting the number of transports of the carrier sheets for each item of identification information as the process; and a transport controller which corrects a transport speed when the carrier sheet is transported by the transport unit in response to the number of transports of the carrier sheet.

5. The image reading apparatus according to claim 4, wherein the transport controller performs correction which increases the transport speed when the carrier sheet is transported by the transport unit as the number of transports increases.

6. The image reading apparatus according to claim 5, further comprising:

a setting unit which sets the content of the processing based on the input information received.

* * * * *